United States Patent
Ibrahim et al.

(10) Patent No.: US 12,556,954 B2
(45) Date of Patent: Feb. 17, 2026

(54) CROSS LINK INTERFERENCE (CLI) REPORT CONFIGURATION IN FULL DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Ahmed Attia Abotabl, San Diego, CA (US); Yu Zhang, San Diego, CA (US); Hwan Joon Kwon, San Diego, CA (US); Wanshi Chen, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/017,018

(22) PCT Filed: Sep. 18, 2020

(86) PCT No.: PCT/CN2020/116148
§ 371 (c)(1),
(2) Date: Jan. 19, 2023

(87) PCT Pub. No.: WO2022/056822
PCT Pub. Date: Mar. 24, 2022

(65) Prior Publication Data
US 2024/0298198 A1    Sep. 5, 2024

(51) Int. Cl.
*H04W 24/10* (2009.01)
*H04B 1/713* (2011.01)
*H04B 7/06* (2006.01)

(52) U.S. Cl.
CPC ............ *H04W 24/10* (2013.01); *H04B 1/713* (2013.01); *H04B 7/0626* (2013.01); *H04B 7/0632* (2013.01); *H04B 7/06968* (2023.05)

(58) Field of Classification Search
CPC ... H04W 24/10; H04B 7/06968; H04B 1/713; H04B 7/0626; H04B 7/0632
See application file for complete search history.

(56) References Cited

U.S. PATENT DOCUMENTS

2018/0367287 A1* 12/2018 Chen .................... H04L 25/0224
2019/0089502 A1* 3/2019 Yi ......................... H04W 16/14
(Continued)

FOREIGN PATENT DOCUMENTS

WO    WO-2020144624 A1 * 7/2020
WO    2020167019 A1    8/2020

OTHER PUBLICATIONS

International Search Report and Written Opinion—PCT/CN2020/116148—ISA/CN—Jun. 17, 2021.
(Continued)

*Primary Examiner* — Derrick V Rose
(74) *Attorney, Agent, or Firm* — QUALCOMM Incorporated

(57) ABSTRACT

A victim user equipment (UE) may experience cross-link interference (CLI) from transmissions from an aggressor UE. The present disclosure provides for configuration of a CLI report that accurately characterizes the CLI experienced by the victim UE. A base station may transmit to the victim UE, a configuration for CLI reporting associated with one or more channel state information interference measurement
(Continued)

(CSI-IM) resources. The victim UE may generate a CLI report based on the configuration for CLI reporting and the CSI-IM resources. The victim UE may transmit the CLI report to the base station. The base station may use the CLI report to mitigate the CLI, for example, by scheduling the aggressor UE and the victim UE to reduce CLI experienced by the victim UE.

35 Claims, 15 Drawing Sheets

(56) References Cited

U.S. PATENT DOCUMENTS

| | | |
|---|---|---|
| 2020/0106488 A1 | 4/2020 | Akoum et al. |
| 2020/0228213 A1* | 7/2020 | Masal ................... H04L 5/14 |
| 2021/0250797 A1* | 8/2021 | Karjalainen .......... H04W 24/10 |
| 2021/0328746 A1* | 10/2021 | Sandberg ................ H04L 5/006 |
| 2022/0095240 A1* | 3/2022 | Ying ..................... H04B 17/336 |
| 2023/0189020 A1* | 6/2023 | Calcev .............. H04W 74/0816 |
| | | 370/329 |

OTHER PUBLICATIONS

Nokia, et al., "Details of UE CLI Measurements", 3GPP TSG-RAN1#96, R1-1902672, Athens, Greece, Feb. 25, 2019-Mar. 1, 2019, 9 Pages, Mar. 1, 2019 (Mar. 1, 2019) sections 3-4.

Nokia, et al., "UE CLI Measurement Configuration and Reporting", R2-1906637, 3GPP TSG-RAN2#106, Reno, USA, May 13, 2019-May 17, 2019, 5 Pages, May 17, 2019 (May 17, 2019), sections 1-3, the whole document.

Nokia, et al., "UE CLI Measurement Configuration, Reporting, and NW Signalling", 3GPP TSG-RAN2#107bis, R2-1912408, Chongqing, China, Oct. 14, 20191-Oct. 18, 2019, 10 Pages, Oct. 18, 2019 (Oct. 18, 2019) sections 1-2, 4.

* cited by examiner

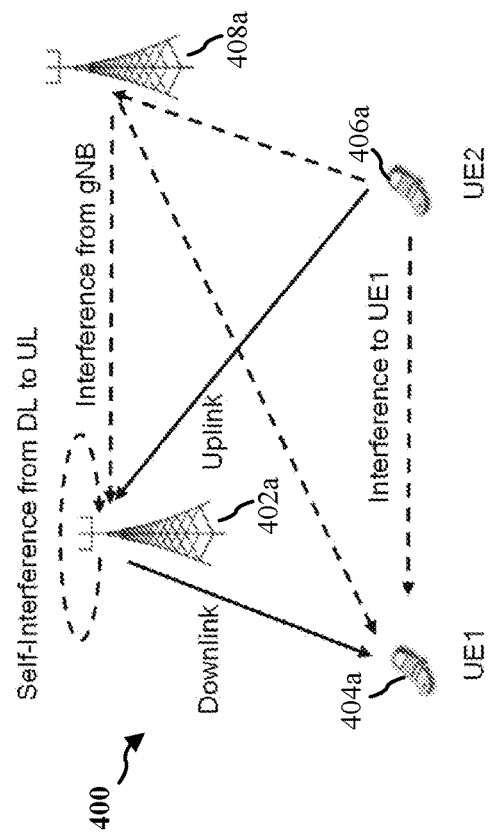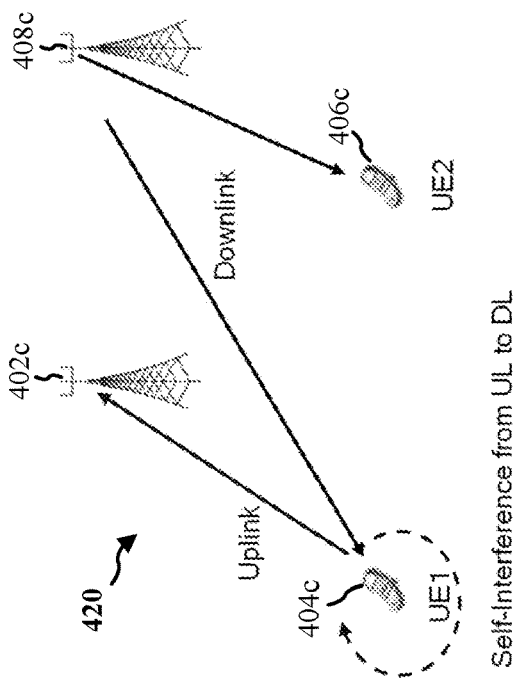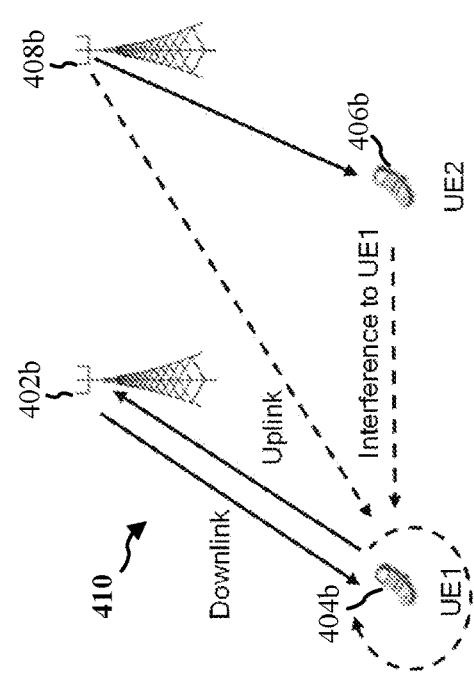
FIG. 4A
FIG. 4B
FIG. 4C

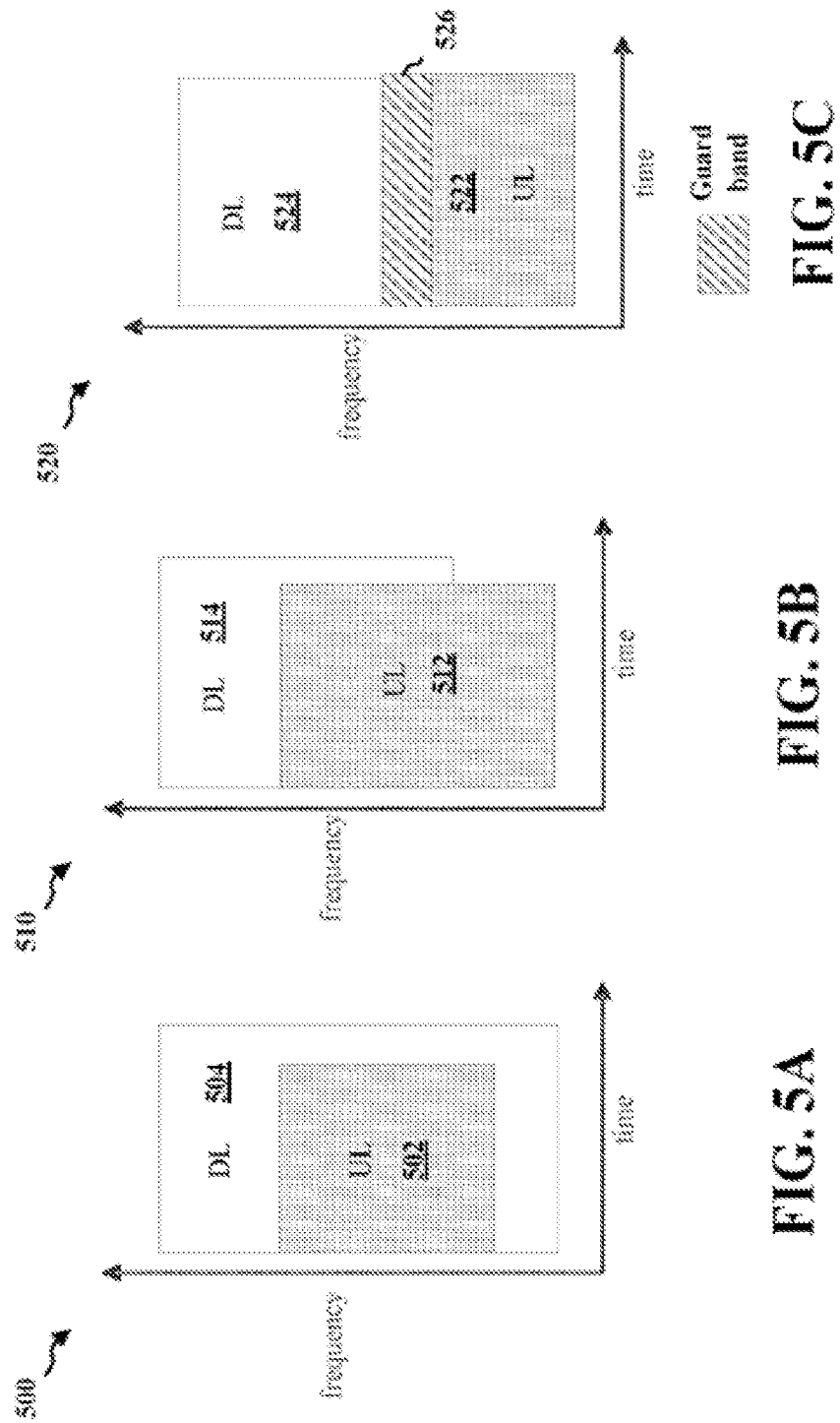

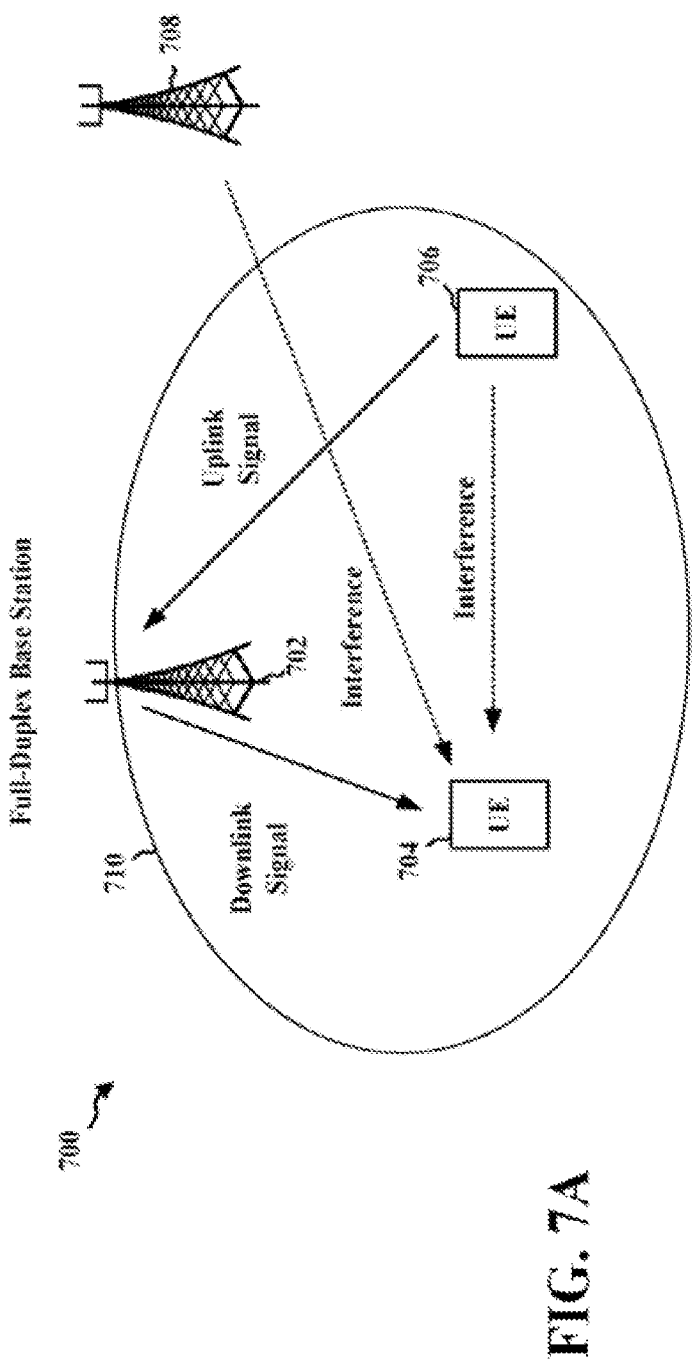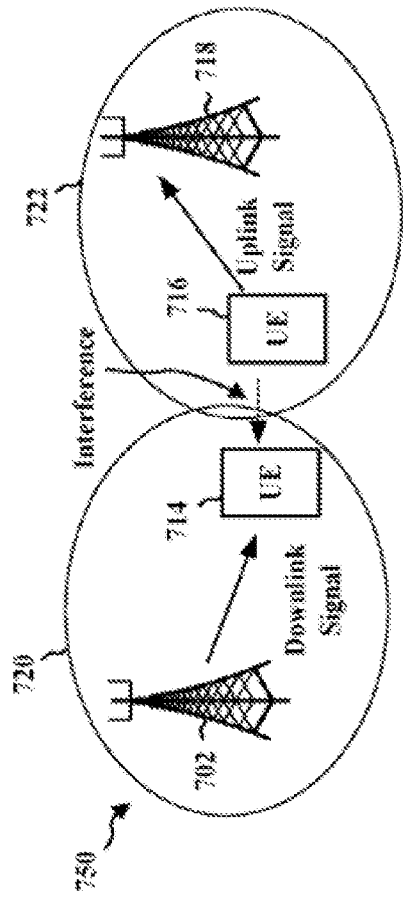
FIG. 7A
FIG. 7B

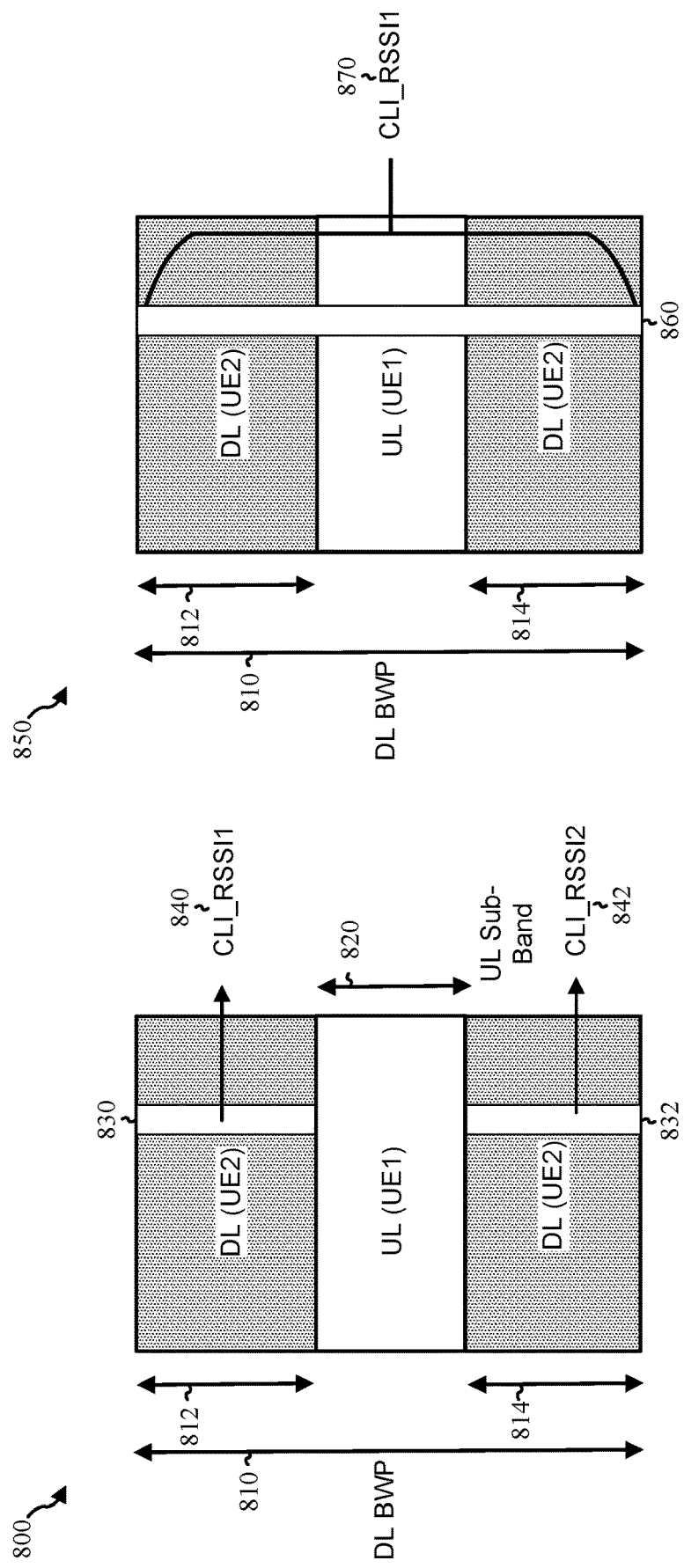

CROSS LINK INTERFERENCE (CLI) REPORT CONFIGURATION IN FULL DUPLEX

This application is a 35 U.S.C. § 371 National Phase of International Patent Application No. PCT/CN2020/116148, entitled "CROSS LINK INTERFERENCE (CLI) REPORT CONFIGURATION IN FULL DUPLEX" and filed on Sep. 18, 2020, the disclosure of which is hereby incorporated by reference in its entirety.

BACKGROUND

Technical Field

The present disclosure relates generally to communication systems, and more particularly, cross-link interference report configuration in full duplex communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus are provided. The method may include receiving, from a base station, a configuration for cross-link interference (CLI) reporting associated with one or more channel state information interference measurement (CSI-IM) resources. The method may include generating a CLI report based on the configuration for CLI reporting. The method may include transmitting the CLI report to the base station.

In some implementations, the CSI-IM resources are defined with respect to a sub-band full-duplex (SBFD) configuration on which the UE is configured to receive on two downlink sub-bands separated by an uplink sub-band.

In some implementations, the configuration for CLI reporting schedules an aperiodic CLI report and indicates at least one of: a wideband CLI report including a single CLI value measured over the two downlink sub-bands or a narrowband CLI report including two CLI values corresponding to the two downlink sub-bands.

In some implementations, the configuration for CLI reporting schedules semi-persistent or periodic CLI reporting according to one of: a wideband CLI report including a single CLI value measured over the two downlink sub-bands or a narrowband CLI report including two CLI values corresponding to the two downlink sub-bands.

In some implementations, the configuration for CLI reporting schedules semi-persistent or periodic CLI reporting that cycles over two CLI values measured over the two downlink sub-bands.

In some implementations, a CSI-IM configuration associated with CLI reporting configures one or more CSI-IM resources that match a sounding reference signal (SRS) frequency hopping pattern of an aggressor UE.

In some implementations, the CLI report includes an average CLI measurement over the one or more CSI-IM resources.

In some implementations, the CSI-IM configuration indicates a CSI-IM resource set for each slot that matches the SRS frequency hopping pattern of the aggressor UE.

In some implementations, the CSI-IM configuration indicates a CSI-IM resource pattern that corresponds to the SRS frequency hopping pattern of the aggressor UE.

In some implementations, the configuration for CLI reporting indicates a wideband CLI report over a sounding bandwidth.

In some implementations, the configuration for CLI reporting indicates a narrowband CLI report matching a per-hop bandwidth.

In some implementations, the configuration for CLI reporting is associated with multiple CSI-IM resources corresponding to multiple aggressor UEs.

In some implementations, transmitting the CLI report to the base station includes determining whether to transmit the CLI report based on an individual CLI threshold for each aggressor.

In some implementations, transmitting the CLI report to the base station includes determining whether to transmit the CLI report based on whether an accumulated CLI for the multiple aggressor UEs exceeds an aggregate CLI threshold.

In some implementations, the CLI report includes the accumulated CLI or an individual CLI for each CSI-IM resource.

In some implementations, transmitting the CLI report to the base station includes determining whether to include an individual CLI value for an individual CSI-IM resource in the CLI report based on whether the individual CLI value exceeds a corresponding per-resource CLI threshold for an individual aggressor.

In some implementations, the method further includes determining a channel quality indicator (CQI) value based on CSI-IM resources indicated by the configuration for CLI reporting.

In some implementations, the configuration for CLI reporting indicates whether to include the CQI value in the CLI report.

In some implementations, the configuration for CLI reporting indicates that the CLI report is to include the CQI value and at least one CLI value.

In some implementations, the configuration for CLI reporting associates the CLI report with a channel state information reference signal (CSI-RS) corresponding to the CQI value.

In some implementations, generating the CLI report based on the configuration for CLI reporting includes determining a reference signal received power (RSRP) value for each aggressor of a plurality of aggressor UEs based on a different cyclic shift of a SRS for each aggressor.

In some implementations, the CLI report includes pairs of the RSRP value and the cyclic shift for each aggressor.

In some implementations, the CLI report includes only RSRP values above a threshold.

In some implementations, the configuration for CLI reporting indicates that CLI is based on SRS and the different cyclic shift for each aggressor.

In some implementations, the configuration for CLI reporting includes a field that indicates SRS resources for the plurality of aggressor UEs.

In some implementations, the method includes receiving a group common downlink control information that indicates SRS resources for the plurality of aggressor UEs.

In some implementations, the configuration for CLI reporting indicates at least one panel specific quasi-co-location (QCL) spatial receive parameter associated with a transmission configuration indicator (TCI) state for CLI measurement.

In some implementations, generating the CLI report based on the configuration for CLI reporting includes measuring a single CLI value based on the at least one panel specific QCL spatial receive parameter.

In some implementations, generating the CLI report based on the configuration for CLI reporting includes measuring a CLI value per TCI state based on the at least one panel specific QCL spatial receive parameter.

In some implementations, generating the CLI report based on the configuration for CLI reporting includes cycling over multiple panels to measure a CLI value per TCI state for each panel based on the at least one panel specific QCL spatial receive parameter.

In some implementations, the configuration for CLI reporting indicates a CSI-IM resource set including resources on different symbols. The CSI-IM resource set may be associated with a list of TCI states, each resource corresponding to one TCI state on the list of TCI states.

In some implementations, generating the CLI report based on the configuration for CLI reporting includes using a QCL spatial receive parameter of a TCI state corresponding to a physical downlink shared channel (PDSCH) when the PDSCH is rate-matched with one of the CSI-IM resources on the same symbol.

In some implementations, generating the CLI report based on the configuration for CLI reporting includes using a QCL spatial receive parameter of the TCI state that corresponds to the CSI-IM resource when a PDSCH is received on a different symbol than the CSI-IM resource.

In some implementations, the PDSCH is separated from the CSI-IM resource by one or more guard symbols.

In some implementations, the method further includes transmitting an indication of whether the UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot In another aspect, a method, a non-transitory computer-readable medium, and an apparatus for a base station are provided. The method may include transmitting, to a victim UE, a configuration for CLI reporting associated with one or more CSI-IM resources. The method may include receiving a CLI report based on the configuration for CLI reporting.

In some implementations, the CSI-IM resources are defined with respect to a SBFD configuration on which the UE is configured to receive on two downlink sub-bands separated by an uplink sub-band.

In some implementations, the configuration for CLI reporting schedules an aperiodic CLI report and indicates at least one of: a wideband CLI report including a single CLI value measured over the two downlink sub-bands or a narrowband CLI report including two CLI values corresponding to the two downlink sub-bands.

In some implementations, the configuration for CLI reporting schedules semi-persistent or periodic CLI reporting according to one of: a wideband CLI report including a single CLI value measured over the two downlink sub-bands or a narrowband CLI report including two CLI values corresponding to the two downlink sub-bands.

In some implementations, the configuration for CLI reporting schedules semi-persistent or periodic CLI reporting that cycles over two CLI values measured over the two downlink sub-bands.

In some implementations, the CSI-IM configuration associated with CLI reporting configures one or more CSI-IM resources that match a sounding reference signal (SRS) frequency hopping pattern of an aggressor UE.

In some implementations, the CLI report includes an average CLI measurement over the one or more CSI-IM resources.

In some implementations, the configuration indicates a CSI-IM resource set for each slot that matches the SRS frequency hopping pattern of the aggressor UE.

In some implementations, the configuration indicates a CSI-IM resource pattern that corresponds to the SRS frequency hopping pattern of the aggressor UE.

In some implementations, the configuration for CLI reporting indicates a wideband CLI report over a sounding bandwidth.

In some implementations, the configuration for CLI reporting indicates a narrowband CLI report matching a per-hop bandwidth.

In some implementations, the configuration for CLI reporting is associated with multiple CSI-IM resources corresponding to multiple aggressor UEs.

In some implementations, the configuration for CLI reporting includes an individual CLI reporting threshold for each aggressor.

In some implementations, the configuration for CLI reporting includes an aggregate CLI reporting threshold for an accumulated CLI of the multiple aggressor.

In some implementations, the configuration for CLI reporting includes an individual CLI reporting threshold for each aggressor and an aggregate CLI reporting threshold for an accumulated CLI of the multiple aggressor UEs.

In some implementations, the CLI report includes individual CLI values that satisfy the individual CLI reporting threshold and the accumulated CLI of the multiple aggressor UEs satisfies the aggregate CLI reporting threshold.

In some implementations, the configuration for CLI reporting indicates whether to include in the CLI report a CQI value based on the CSI-IM resources associated with the configuration for CLI reporting.

In some implementations, the configuration for CLI reporting associates the CLI report with a CSI-RS corresponding to the CQI value.

In some implementations, the method further includes configuring a plurality of aggressor UEs with different cyclic shifts for a SRS corresponding to the CSI-IM resources for the victim UE.

In some implementations, the CLI report includes pairs of a RSRP value and the cyclic shift for each aggressor UE.

In some implementations, the CLI report includes only RSRP values above a threshold.

In some implementations, the configuration for CLI reporting indicates that CLI is based on SRS and the different cyclic shift for each aggressor.

In some implementations, the configuration for CLI reporting includes a field that indicates the SRS resources for the plurality of aggressor UEs.

In some implementations, configuring a plurality of aggressor UEs includes transmitting a group common downlink control information that indicates SRS resources for the plurality of aggressor UEs.

In some implementations, the configuration for CLI reporting indicates at least one panel specific QCL spatial receive parameter associated with a TCI state for CLI measurement.

In some implementations, the CLI report includes a single CLI value based on the at least one panel specific QCL spatial receive parameter.

In some implementations, the CLI report includes a CLI value per TCI state based on the at least one panel specific QCL spatial receive parameter.

In some implementations, the CLI report includes a CLI value per TCI state for each panel based on the at least one panel specific QCL spatial receive parameter.

In some implementations, the configuration for CLI reporting indicates a CSI-IM resource set including resources on different symbols, wherein the CSI-IM resource set is associated with a list of TCI states, each resource corresponding to one TCI state on the list of TCI states.

In some implementations, the CLI report includes a CLI value based on a QCL spatial receive parameter of a TCI state corresponding to a PDSCH when the PDSCH is rate-matched with one of the CSI-IM resources on the same symbol.

In some implementations, the CLI report includes a CLI value based on a QCL spatial receive parameter of the TCI state that corresponds to the CSI-IM resource when a PDSCH is received on a different symbol than the CSI-IM resource.

In some implementations, the PDSCH is separated from the CSI-IM resource by one or more guard symbols.

In some implementations, the method further includes receiving an indication of whether the UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, and 4C illustrate exemplary modes of full-duplex communication.

FIGS. 5A and 5B illustrate examples of resources that are in-band full duplex (IBFD).

FIG. 5C illustrates an example of resources for sub-band full-duplex communication.

FIGS. 7A and 7B illustrate examples of intra-cell and inter-cell interference.

FIG. 8A illustrates example resources for narrow-band CLI reports.

FIG. 8B illustrates example resources for wide-band CLI reports.

DETAILED DESCRIPTION

Figure 1:
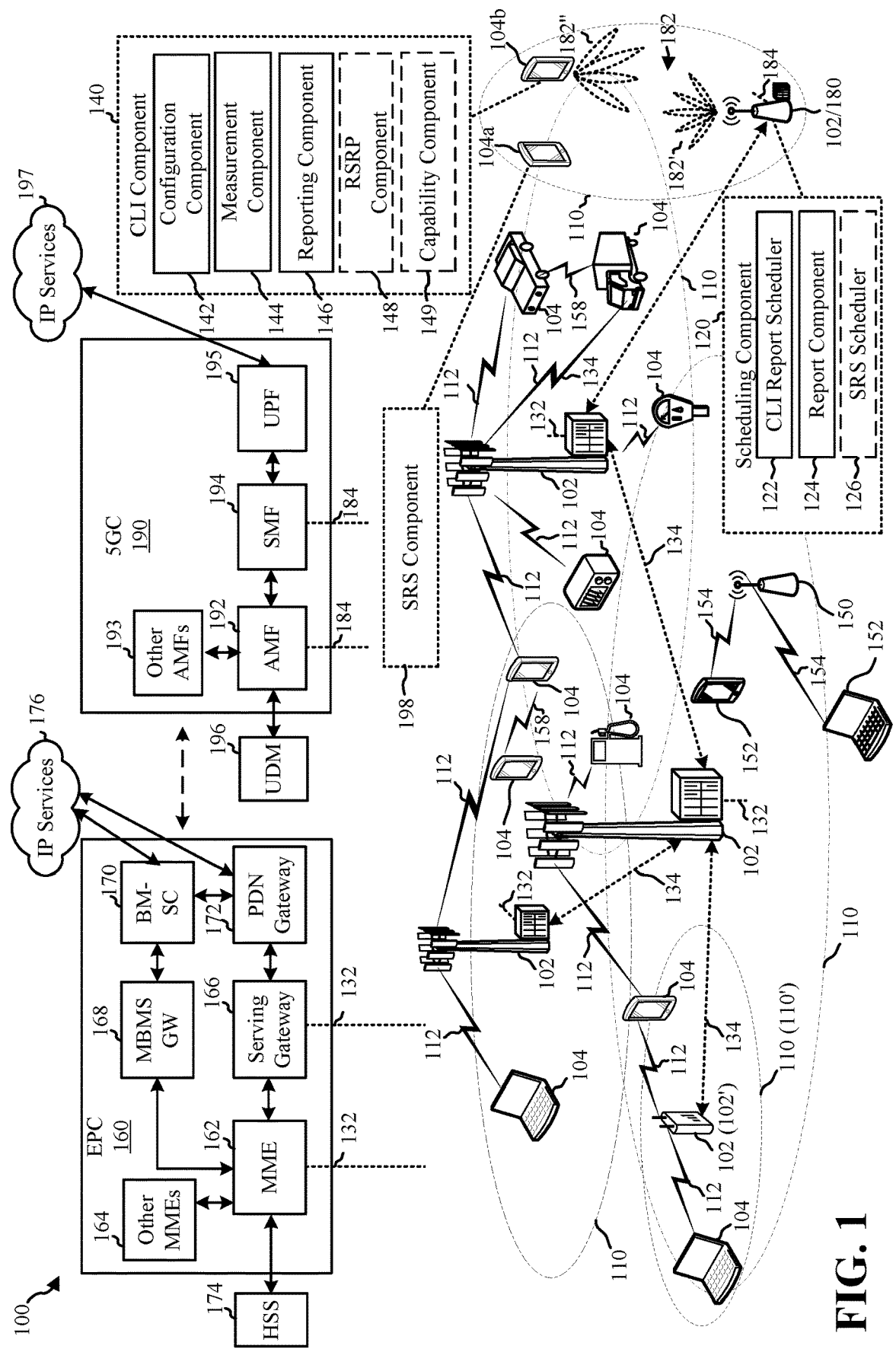
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Full duplex communication may allow a wireless communication device to transmit and receive at the same time. In-band full duplex (IBFD) may refer to transmission and reception on the same time and frequency resource. The uplink (UL) and the downlink (DL) may share the same IBFD time and frequency resource, which may include fully overlapping resources or partially overlapping resources. Sub-band frequency division duplexing (SBFD) may refer to transmission and reception at the same time on different frequency resources. The DL resource may be separated from the UL resource in the frequency domain. In an access network, a base station and/or a user equipment (UE) may be capable of either IBFD or SBFD.

The presence of full duplex devices in an access network may result in configurations with different types of interference experienced by a UE. Inter-cell interference may include interference from other gNBs and exist without the presence of full duplex devices. Channel state information (CSI) measurements may be used to measure inter-cell interference. Inter-cell cross-link interference (CLI) may occur between UEs in adjacent cells. Intra-cell CLI may occur between UEs in the same cell. For example, an uplink transmission from an aggressor UE may interfere with a downlink reception of a victim UE. In the case of a full-duplex UE, self-interference (SI) may be considered a special case of intra-cell CLI, where the transmitter of the UE acts as an aggressor UE that interferes with a downlink reception by the receiver of the UE.

In an aspect, the present disclosure provides for configuring a victim UE to generate a CLI report. The configuration of the CLI report may indicate CLI values to include in the CLI report or specific ways to measure the CLI. Accordingly, the base station may configure the victim UE to generate a CLI report that may be useful for mitigating interference due to CLI. For example, for a SBFD configuration, the configuration of the CLI report may indicate either a wideband CLI report measured over two downlink sub-bands or a narrowband CLI report including two CLI values corresponding to the two downlink sub-bands. As another example, the configuration for the CLI report may be associated with a channel state information (CSI) interference measurement (IM) resource configuration that matches a frequency hopping pattern of a sounding reference signal (SRS) of an aggressor UE. The configuration for the CLI report may indicate a wideband average CLI over a whole sounding bandwidth or a sub-band average CLI that matches a per-hop bandwidth. In some implementations, the configuration for the CLI report may indicate one or more thresholds for individual or accumulated CLI values for multiple aggressor UEs. In some implementations, the configuration for the CLI report may indicate whether to include a channel quality indicator (CQI) measured based on the CSI-IM resources in the CLI report. In some implementations, the configuration for the CLI report may indicate whether to measure a reference signal received power (RSRP) for different aggressor UEs based on different cyclic shifts of the SRS. In some implementations, the configuration for the CLI report may indicate a quasi-co-location (QCL) spatial parameter to use for a measurement of the CLI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The UEs 104 may include an aggressor UE 104a and a victim UE 104b. The base stations 102 may include macrocells (high power cellular base station) and/or small cells (low power cellular base station). The macrocells include base stations. The small cells include femtocells, picocells, and microcells.

One or more of the UEs 104 (e.g., the victim UE 104b) may include a CLI component 140 that measures a CLI based on a configuration and reports the CLI to the base station 102. The CLI component 140 may include a configuration component 142 configured to receive, from a base station, a configuration for cross-link interference (CLI) reporting associated with one or more channel state information interference measurement (CSI-IM) resources. The CLI component 140 may include a measurement component 144 configured to generate a CLI report based on the configuration for CLI reporting. The CLI component 140 may include a reporting component 146 configured to transmit the CLI report to the base station. In some implementations, the CLI component 140 may optionally include a RSRP component configured to measure an RSRP for different aggressor UEs 104a. In some implementations, the CLI component 140 may optionally include a capability component 149 configured to transmit an indication of one or more capabilities of the UE 104 related to CLI measurement and reporting.

In an aspect, one or more of the aggressor UEs 104a may include a sounding reference signal (SRS) component 198 configured to transmit a SRS, which may be used by the victim UE 104b for CLI measurements.

In an aspect, one or more of the base stations 102 may include a scheduling component 120 that performs the actions of the base station as described herein (e.g., scheduling the scheduling victim UEs to measure CLI and aggressor UEs to transmit SRS. For example, the scheduling component 120 may include a CLI report scheduler 122 configured to transmit a configuration for cross-link interference (CLI) reporting associated with one or more channel state information interference measurement (CSI-IM) resources. The scheduling component 120 may include a report component 124 configured to receive a CLI report based on the configuration for CLI reporting. The scheduling component 120 may include a SRS scheduler 126 configured to configure a plurality of aggressor UEs with different cyclic shifts for a SRS corresponding to the CSI-IM resources for the victim UE.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
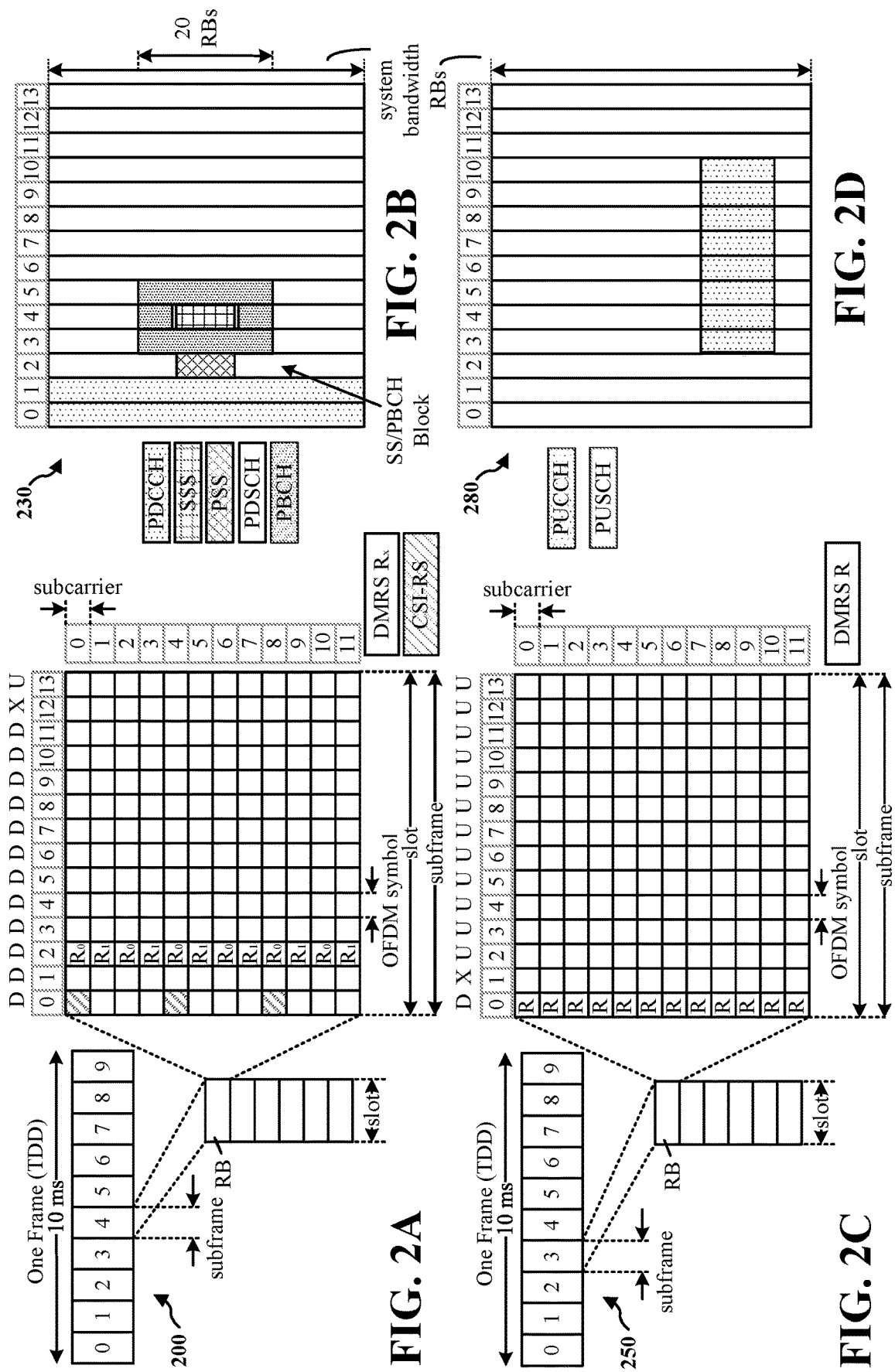
FIG. 2A is a diagram illustrating an example of a first frame, in accordance with certain aspects of the present description.
FIG. 2B is a diagram illustrating an example of DL channels within a subframe, in accordance with certain aspects of the present description.
FIG. 2C is a diagram illustrating an example of a second frame, in accordance with certain aspects of the present description.
FIG. 2D is a diagram illustrating an example of UL channels within a subframe, in accordance with certain aspects of the present description.

FIGS. 2A-2D are resource diagrams illustrating example frame structures and channels that may be used for uplink, downlink, and sidelink transmissions to a UE 104 including a CLI component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD. Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
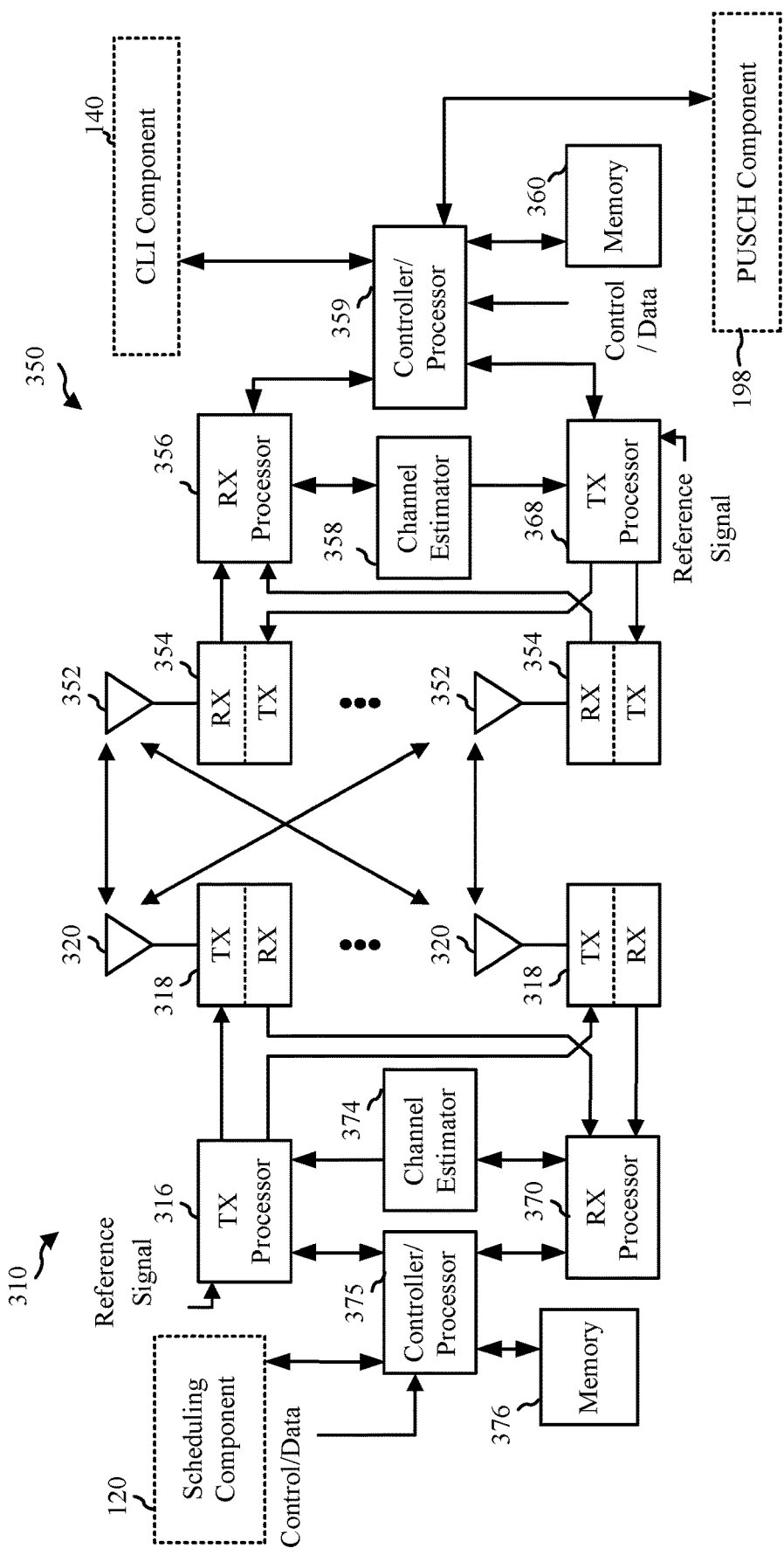
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CLI component 140 and/or the SRS component 198 of FIG. 1.

At least one of the TX processor 316, the RX processor 370, and the controller/processor 375 may be configured to perform aspects in connection with the scheduling component 120 of FIG. 1.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference at the receiving antenna that is receiving the uplink signal from UE 406a due to receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

FIGS. 5A-5B illustrate a first example 500 and a second example 510 of in-band full duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band FD (SBFD), where uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FD may also be referred to as "flexible duplex".

Figure 6:
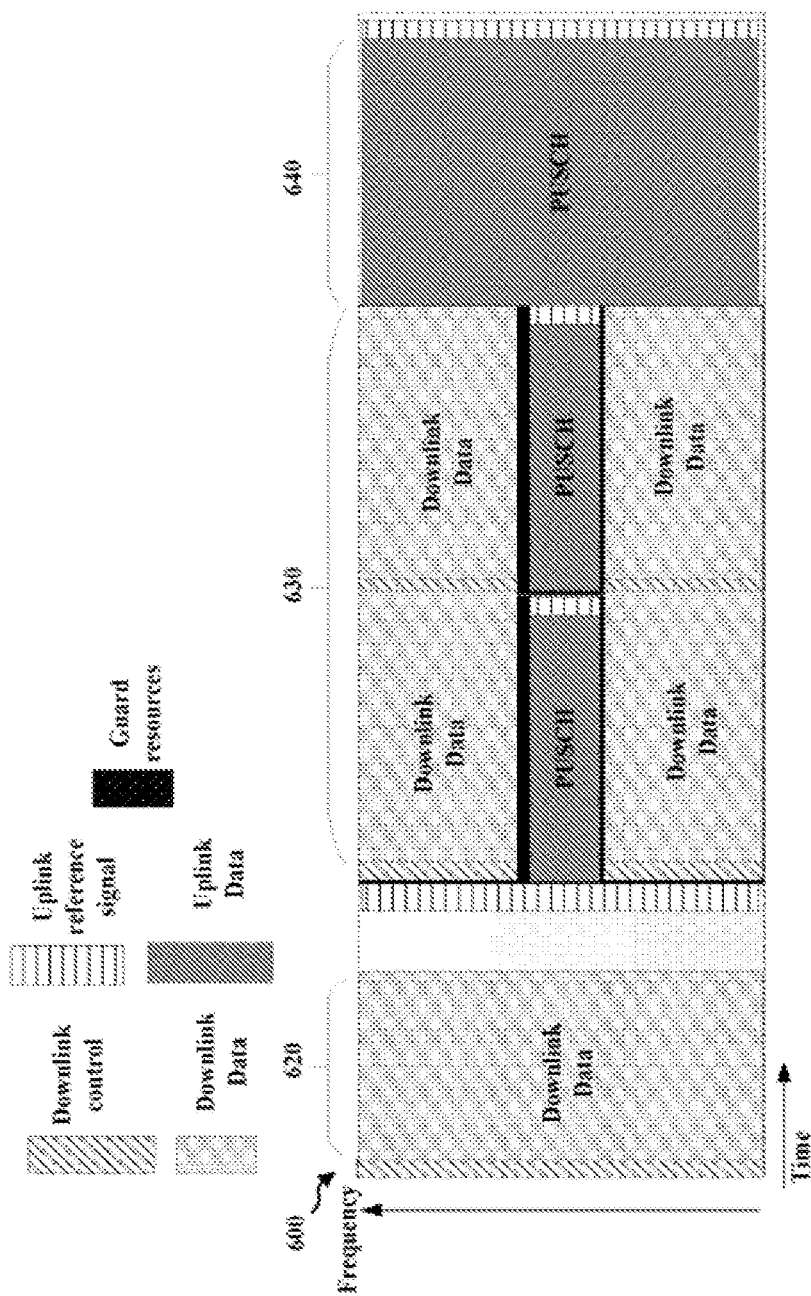
FIG. 6 is an example of time and frequency resources including full-duplex resources.

FIG. 6 illustrates an example set of time and frequency resources 600 that include both half duplex and full duplex periods. For example, the period of time 620 includes half duplex resources for downlink data. The period of time 620 includes sub-band full-duplex resources for uplink transmissions (e.g., PUSCH) and downlink reception (e.g., downlink data). The period of time 640 includes half duplex resources for uplink data.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period 630 may extend for one or more symbols (e.g., full-duplex symbols or D+U symbols).

FIG. 7A illustrates an example communication system 700 with a full-duplex base station 702 that includes intra-cell cross-link interference (CLI) caused to UE 704 by UE 706 that are located within the same cell coverage 710 as well as inter-cell interference from a base station 708 outside of the cell coverage 710. FIG. 7B illustrates an example communication system 750 showing inter-cell cross-link interference from UE 716 that interferences with downlink reception for UE 714. The UE 714 is in the cell coverage 720 of base station 712, and the UE 716 is in the cell coverage 722 of the base station 718. Although not shown, a full-duplex UE may cause self-interference to its own downlink reception.

In sub-band full duplex (SBFD), a base station may configure a downlink transmission to a UE in frequency domain resources that are adjacent to frequency domain resources for uplink transmissions for another UE. For example, in FIG. 7A, the frequency resources for the downlink transmission to the UE 704 may be adjacent to the frequency resources for the uplink transmission from the UE 706.

FIG. 8A is a diagram illustrating example resources 800 for narrow-band CLI reporting of CLI from a first UE (UE1) to a second UE (UE2). The first UE may transmit a PUSCH transmission on a UL sub-band 820 and may be considered an aggressor UE. The second UE (UE2) may receive a downlink transmission such as a PDSCH on a DL BWP 810, which may include one or more DL sub-bands 812, 814. The second UE may be considered a victim UE. The CLI experienced on the DL sub-band 812 may differ from the CLI experienced on the DL sub-band 814. In some scenarios, it may be beneficial for a base station 102 to determine whether scheduling the second UE on one of the DL sub-bands 812, 814 may be preferable. The base station 102 may configure the victim UE 104*b* to measure a narrow-band CLI on each of the sub-bands 812, 814. For example, the victim UE 104*b* may measure the CSI-IM resources 830 to generate a first CLI RSSI 840 and may measure the CSI-IM resources 832 to generate a second CLI RSSI 842.

FIG. 8B is a diagram illustrating example resources 850 for wide-band CLI reporting of CLI from the first UE (UE1) to the second UE (UE2). As in FIG. 8A, the first UE may transmit a PUSCH transmission on a UL sub-band 820 and may be considered an aggressor UE. The second UE (UE2) may receive a downlink transmission such as a PDSCH on the DL BWP 810. The base station 102 may configure the victim UE 104*b* to measure CSI-IM resources 860 to generate a single wide-band CLI RSSI 870. The single wide-band CLI RSSI 870 may provide a general level of CLI and generate less overhead than the a first CLI RSSI 840 and the second CLI RSSI 842.

In an aspect, the present disclosure provides for configurable CLI reporting. The base station 102 may transmit a configuration of CLI reporting associated with CSI-IM resources. In the example of SBFD resources illustrated in FIGS. 8A and 8B, the configuration of CLI reporting may indicate the narrow-band CLI report, the wide-band CLI report, or a combination thereof. The configuration of CLI reporting may configure an aperiodic CLI report, a semi-persistent CLI report, or a periodic CLI report. For aperiodic CLI reporting, the base station 102 may configure the victim UE 104*b* to send indicates at least one of: the wideband CLI report including a single CLI value measured over the two downlink sub-bands (e.g., CLI RSSI 870) or a narrowband CLI report including two CLI values (e.g., CLI RSSI 840 and 842) corresponding to the two downlink sub-bands 812 and 814. For semi-persistent or periodic CLI reporting, the base station 102 may configure the victim UE 104*b* to send one of: a wideband CLI report including a single CLI value (e.g., CLI RSSI 870) measured over the two downlink sub-bands or a narrowband CLI report including two CLI values (e.g., CLI RSSI 840 and 842) corresponding to the two downlink sub-bands for each CLI reporting occasion. In some implementations, the base station 102 may configure the victim UE 104*b* to send semi-persistent or periodic CLI reporting that cycles over two CLI values (e.g., CLI RSSI 840 and 842) measured over the two downlink sub-bands.

In an aspect, the CLI measurement may be based on one or more SRS transmitted by one or more aggressor UEs 104*a*. In some implementations, an aggressor UE 104*a* may be configured with an SRS pattern that hops the frequency of the SRS over time either within a slot (intra-slot hopping) or between slots (inter-slot hopping). The base station may configure the victim UE 104*b* with CSI-IM resources that match the SRS frequency hopping pattern of the aggressor UE 104*a*. The victim UE 104*b* may be configured to report an average CLI measurement over the configured CSI-IM resources. In some implementations, the configuration of the CSI-IM resources indicates a CSI-IM resource set for each slot that matches the SRS frequency hopping pattern of the aggressor UE. In some implementations, the configuration of the CSI-IM resources indicates a CSI-IM resource pattern that corresponds to the SRS frequency hopping pattern of the aggressor UE. The configuration for CLI reporting may indicate either a wideband CLI report over a sounding bandwidth or a narrowband CLI report matching a per-hop bandwidth.

In the case of multiple aggressor UEs, the configuration for CLI reporting may be associated with multiple CSI-IM resources corresponding to multiple aggressor UEs. To reduce reporting overhead, the base station 102 may semi-statically (e.g., using RRC signaling) or dynamically (e.g., via a DCI indication) configure the victim UE 102*b* with a threshold for CLI reporting. If a measured CLI is less than the threshold, the victim UE 104*b* may refrain from transmitting a CLI report. In some cases, CLI from individual aggressor UEs can be below the threshold, however aggregate CLI may be above the threshold. The configuration for CLI reporting may indicate one or more individual thresholds, an aggregate threshold, or a combination thereof for determining whether to report measured CLI values. In some implementations, only an individual CLI threshold (e.g., an RSSI value) is configured, and the victim UE 104*b* may refrain from transmitting any CLI measurement that is less than the individual CLI threshold. In some implementations, the victim UE 104*b* may be configured with an aggregate CLI threshold, and the victim UE 104 may compare an accumulated CLI for the multiple aggressor UEs to the aggregate CLI threshold. If the aggregate CLI threshold is satisfied, the victim UE 104*b* may report the accumulated CLI or each of the individual CLI values. In some implementations, the victim UE 104*b* may be configured with a per-resource CLI threshold for individual aggressor UEs and the aggregate CLI threshold. The victim UE 104*b* may drop the CLI report if the aggregate CLI threshold is not satisfied and may include only individual CLI values that satisfy the per-resource CLI threshold when the aggregate CLI threshold is satisfied.

In an aspect, the CLI measurements may also be relevant to CSI reporting such as a channel quality indicator (CQI). The CLI measurements may be made on CSI-IM resources, which may also be used to determine CQI. The configuration for CLI reporting may indicate whether the CLI measurements may be used to determine CQI. The configuration for CLI reporting may indicate whether a CQI based on the CLI measurements is to be included in the CLI report. For example, the configuration for CLI reporting may include a report quantity parameter that may have one of two values. For instance, a value of 0 may indicate to include only an RSSI value for CLI and a value of 1 may indicate to include the RSSI value for CLI and a CQI index. In some implementations, the configuration for CLI reporting may also be associated with CSI reference signal (CSI-RS) resources that indicate a CQI value to be reported based on the CLI measurement.

In an aspect, where there are multiple aggressor UEs, each aggressor UE may be configured with a different cyclic shift for the SRS. The victim UE 104*b* may differentiate the SRS for different aggressor UEs 104*a* based on the cyclic shift of the SRS. The victim UE 104*b* may measure a reference signal received power (RSRP) for individual aggressor UEs based on the cyclic shift of the SRS. The victim UE 104*b* may include pairs of the RSRP value and the cyclic shift for each aggressor in the CLI report. The RSRP values may indicate the amount of interference caused by each aggressor UE to the base station 102. The victim UE 104*b* may filter the RSRP values based on a threshold to reduce a size of the CLI report. The configuration for CLI reporting may indicate that the CLI is based on SRS and indicate the different cyclic shift for each aggressor. The configuration for CLI reporting may include a field that indicates the SRS resource for each of the plurality of aggressor UEs. In some implementations, the configuration for CLI reporting may include a group common downlink control information (DCI) that indicates SRS resources for the plurality of aggressor UEs.

Figure 9:
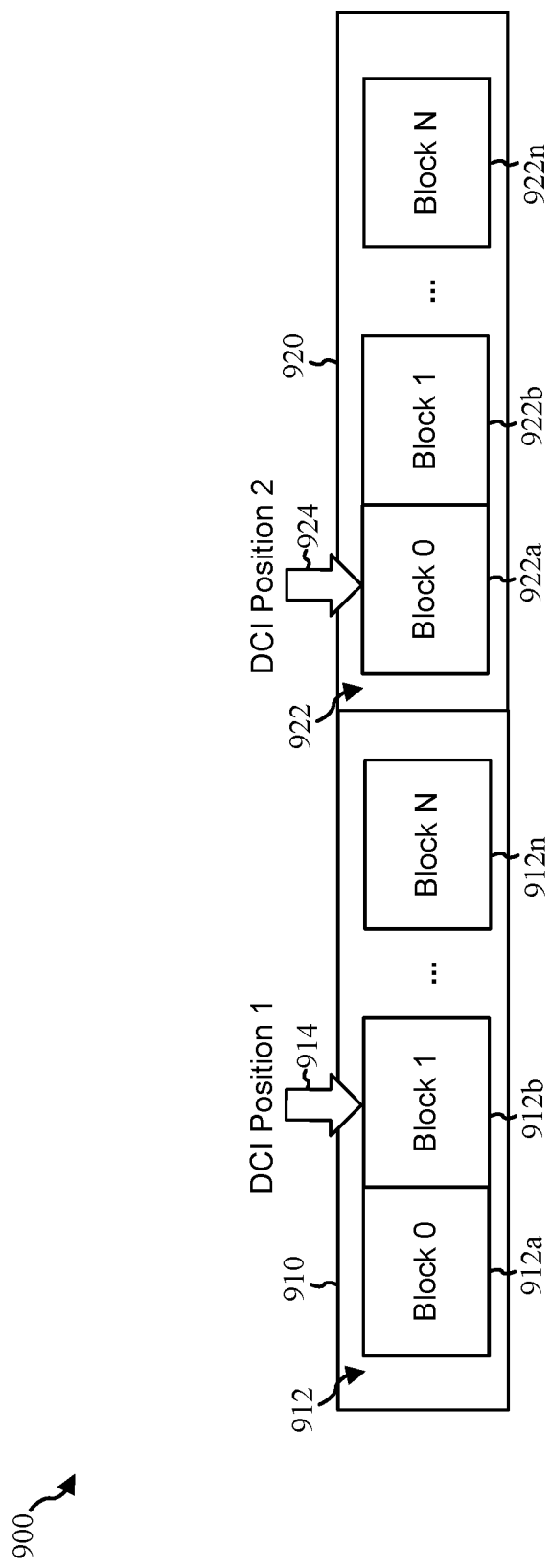
FIG. 9 illustrates an example group common downlink control information (DCI).

FIG. 9 illustrates an example group common DCI 900. The group common DCI 900 may include a first part 910 that schedules one or more SRS transmissions from one or more aggressor UEs and a second part 920 that indicates CSI-IM resources for victim UEs. The first part 910 may include one or more blocks 912 (e.g., blocks 912*a*, 912*b*, . . . 912*n*). Each block 912 may indicate a set of SRS resources. Each aggressor UE 104*a* may be configured with a DCI position index 914 that points to one of the blocks. In some implementations, two or more aggressor UEs 104*a* that are configured with different cyclic shifts may be assigned the same set of SRS resources. The second part 920 may include one or more blocks 922 (e.g., blocks 922*a*, 922*b*, . . . , 922*n*). Each block 922 may include SRS resources and a cyclic shift to indicate to the victim UE which cyclic shift is used by aggressors. For example, a block 922 may include a pair of an SRS index and a cyclic shift. Each victim UE 104*b* may be configured with a DCI position index 924 corresponding to one of the one or more blocks. Each victim UE 104*b* may measure a CLI on the indicated SRS resource using the indicated cyclic shift.

In an aspect, the victim UE 104*b* may include multiple panels. A panel may refer to a group of antennas or antenna elements. The victim UE 104*b* may use different panels for UL and DL. The base station 102 may configure the victim UE 104*b* with a panel specific QCL spatial relation parameter, which may be referred to as QCL Type-D. The QCL spatial relation parameter may be associated with a transmission configuration indicator (TCI) state. The victim UE 104*b* may use one or more panels for measuring CLI and may report one CLI value to the base station 102. For example, the victim UE 104*b* may measure a single CLI value based on the at least one panel specific QCL spatial receive parameter. In some implementations, the victim UE 104*b* may use one or more panels for measuring CLI and report a per-TCI state CLI value. For example, the victim UE 104*b* may measure a CLI value per TCI state based on the at least one panel specific QCL spatial receive parameter. In some implementations, the victim UE 104*b* may cycle over the receive panels (i.e., panels for DL) for measuring CLI and report a per-TCI state CLI value or an average CLI value. For example, the victim UE 104*b* may cycle over multiple panels to measure a CLI value per TCI state for each panel based on the at least one panel specific QCL spatial receive parameter.

In an aspect, the victim UE 104*b* may measure the CLI in multiple symbols in a slot using a different QCL spatial relation parameter. Changing the QCL spatial relation parameter may include a digital and/or analog antenna configuration change. In particular, there may be time delay for an analog antenna configuration change. Accordingly, a UE may not be capable of performing a CLI measurement and receiving a PDSCH in a same symbol or in adjacent symbols. The base station 102 may configure the victim UE 104*b* with a CSI-IM resource set including multiple resources which are configured on different symbols. The CSI-IM resource set may be associated with a list of TCI states with each resources corresponding to one TCI state in the list. In some implementations, the victim UE 104*b* may perform the CLI measurement using a QCL spatial receive parameter of a TCI state corresponding to the PDSCH when the PDSCH is rate-matched with one of the CSI-IM resources on the same symbol. The rate matching may indicate that the CSI-IM resource does not include PDSCH bits, but other resource elements (REs) on the symbol do include PDSCH bits. Accordingly, to receive the PDSCH on the other REs, the victim UE 104*b* may use the QCL spatial receive parameter associated with the TCI state for the PDSCH to perform the CLI measurement, even if a different TCI state is associated with the CSI-IM resource. In contrast, when a PDSCH is received on a different symbol than the CSI-IM resource, the victim UE 104*b* may use a QCL spatial receive parameter of the TCI state that corresponds to the CSI-IM resource. The PDSCH may be separated from the CSI-IM by one or more guard symbols. The number of guard symbols may be based on a reported UE capability.

In an aspect, the victim UE 104*b* may transmit an indication of a capability related to CLI reporting. Example UE capabilities may include an indication of whether the UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot.

Figure 10:
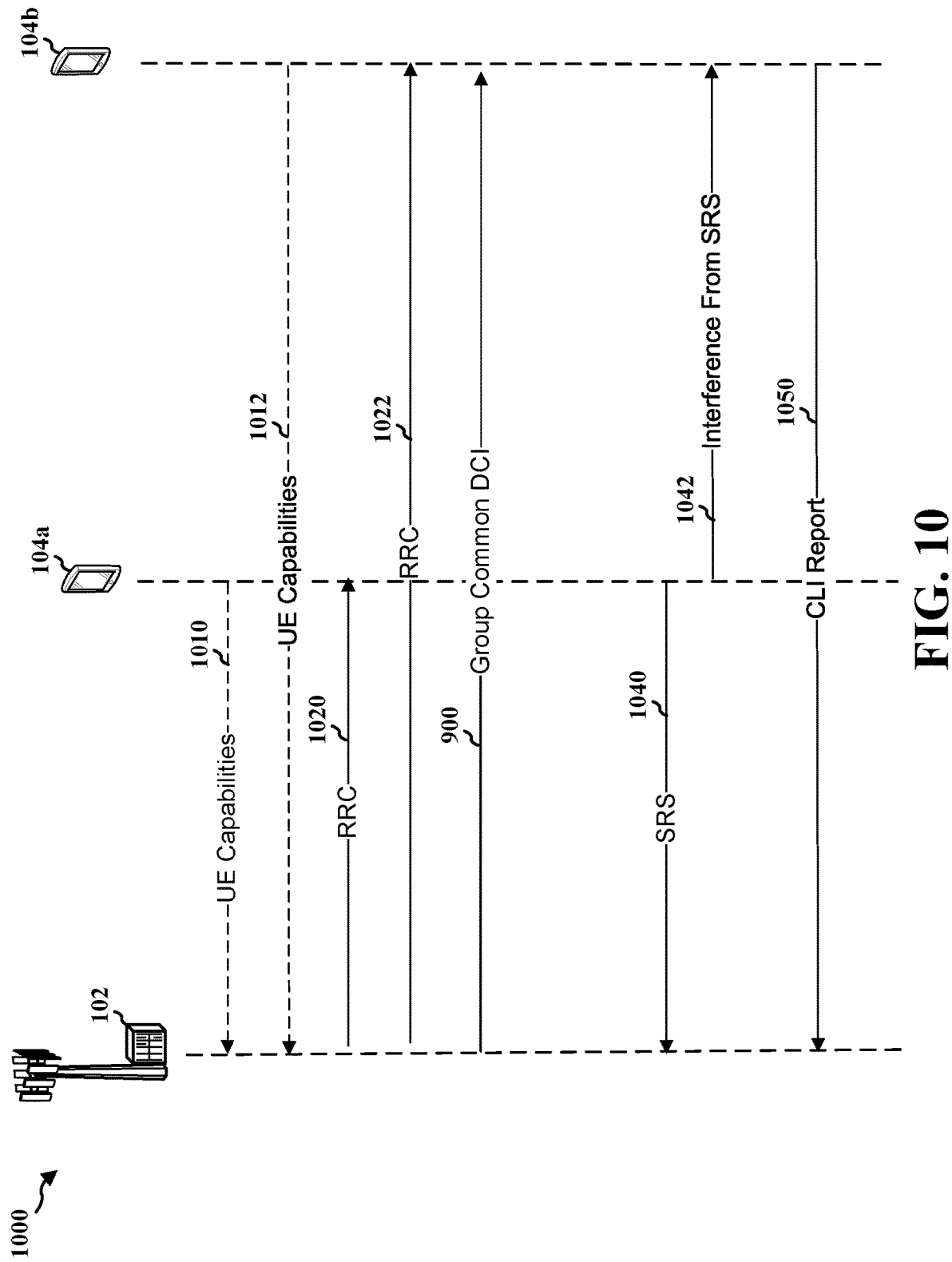
FIG. 10 is a message diagram illustrating example messages for cross-link interference (CLI) reporting with dynamic scheduling.

FIG. 10 is a message diagram 1000 illustrating example messages for CLI reporting with dynamic scheduling. A base station 102 may be a serving base station for an aggressor UE 104*a* and a victim UE 104*b*. Both the aggressor UE 104*a* and the victim UE 104*b* may transmit UE capabilities 1010, 1012 indicating the respective capabilities of the UE 104 with respect to CLI reporting. The base station 102 configure the aggressor UE 104*a* via RRC signaling 1020. For example, the RRC signaling 1020 may indicate SRS resources, which may follow an SRS frequency hopping pattern. In some implementations the RRC signaling 1020 may indicate the index 914. The base station 102 may configure the victim UE 104*b* via RRC signaling 1022. For example, the RRC signaling 1022 may include one or more parameters of the configuration for CLI reporting. The base station 102 may transmit the group common DCI 900 to both the aggressor UE 104*a* and the victim UE 104*b*. The group common DCI 900 may indicate the SRS resources and/or cyclic shift to the aggressor UE 104a. The group common DCI 900 may indicate the CSI-IM resources (e.g., corresponding to the SRS resources) and one or more cyclic shifts to the victim UE 104b. The aggressor UE 104a may transmit a SRS 1040 based on the group common DCI 900. The victim UE 104b may receive the SRS 1040 as interference 1042. The victim UE 104b may measure the interference 1042 from the SRS 1040 on the CSI-IM resources. The victim UE 104b may generate a CLI report 1050 based on the measurements.

Figure 11:
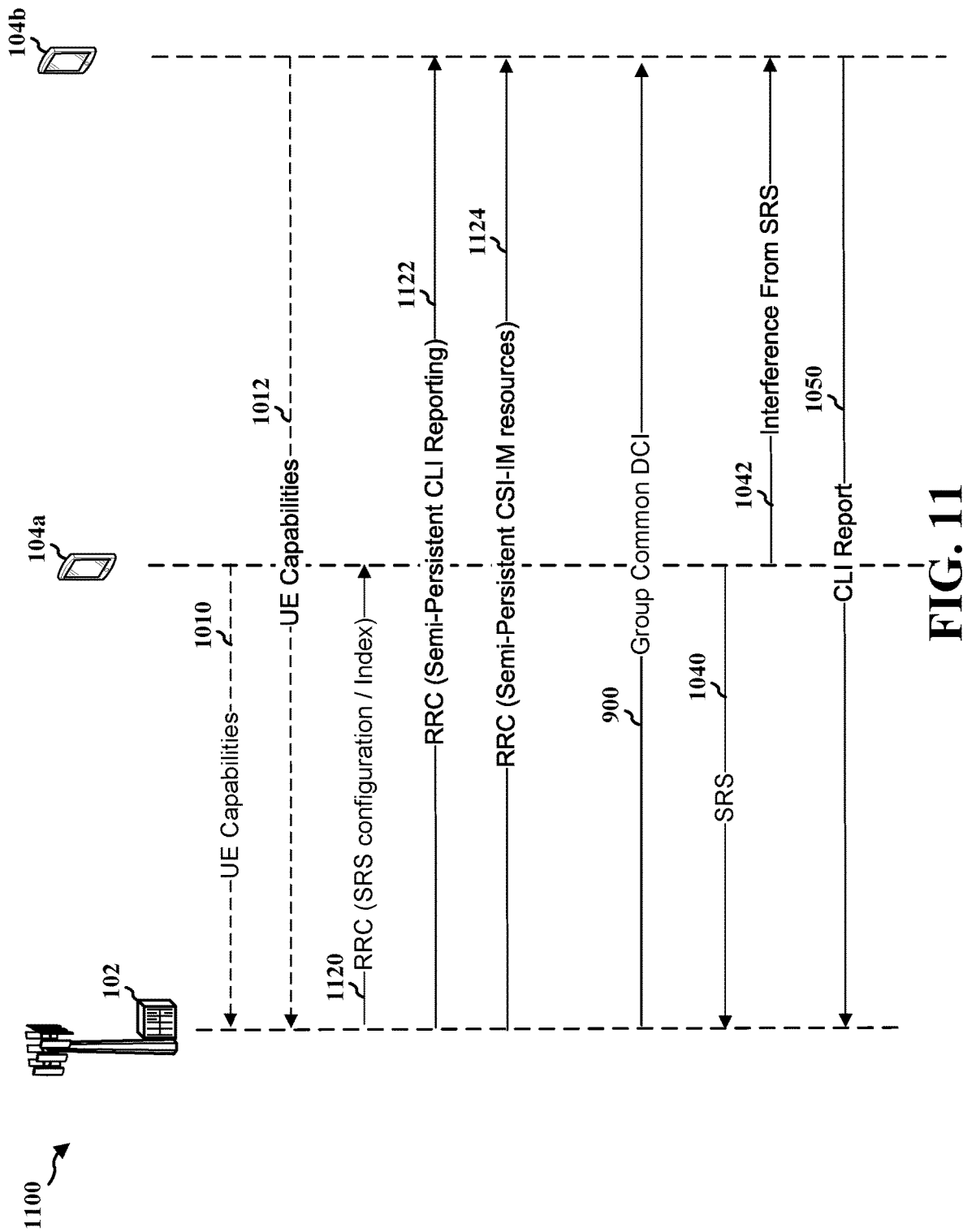
FIG. 11 is a message diagram illustrating example messages for CLI reporting with semi-persistent scheduling.

FIG. 11 is a message diagram 1100 illustrating example messages for CLI reporting with semi-persistent scheduling. A base station 102 may be a serving base station for an aggressor UE 104a and a victim UE 104b. Both the aggressor UE 104a and the victim UE 104b may transmit UE capabilities 1010, 1012 indicating the respective capabilities of the UE 104 with respect to CLI reporting. The base station 102 may transmit an RRC configuration 1120 to configure the aggressor UE 104a with one or more SRS configurations and/or an index 914. The base station 102 may transmit an RRC message 1122 including a configuration for CLI reporting including semi-persistent CLI reporting to a victim UE 104b. The base station 102 may transmit an RRC message 1124 including a configuration for semi-persistent CSI-IM resources associated with the configuration for CLI reporting. The RRC message 1124 may include the index 924 for the victim UE 104b. A group common DCI 900 may be used to activate an SRS configuration for each aggressor UE 104a and the semi-persistent CLI reporting or associated CSI-IM resources for the victim UE 104b. The aggressor UE 104a may transmit a SRS 1040 based on the SRS configuration indicated by the group common DCI 900. The victim UE 104b may receive the SRS 1040 as interference 1042. The victim UE 104b may measure the interference 1042 from the SRS 1040 on the CSI-IM resources. The victim UE 104b may generate a CLI report 1050 based on the measurements.

Figure 12:
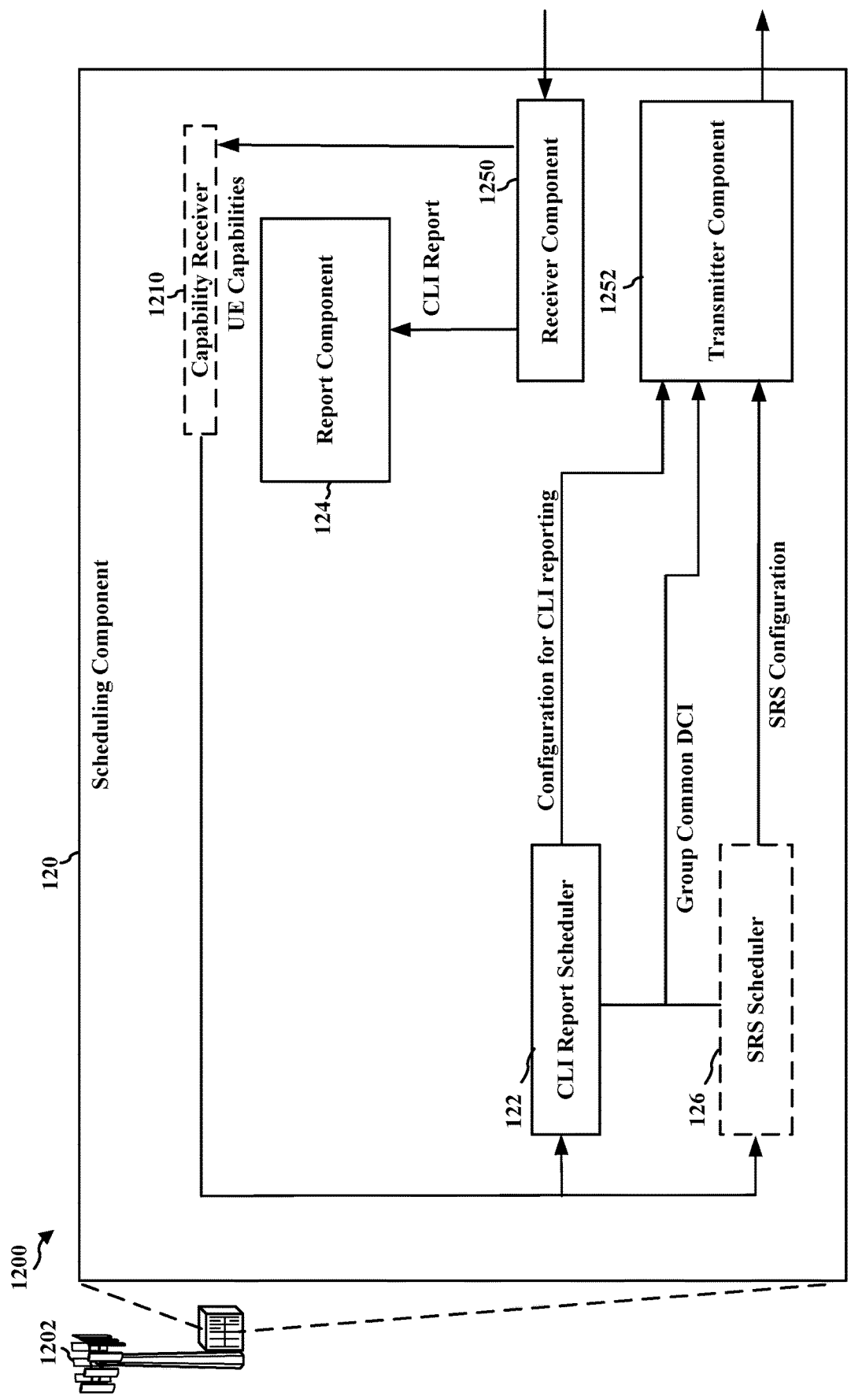
FIG. 12 is a conceptual data flow diagram illustrating the data flow between different means/components in an example BS.

FIG. 12 is a conceptual data flow diagram 1200 illustrating the data flow between different means/components in an example base station 1202, which may be an example of the base station 102 including the scheduling component 120. The scheduling component 120 may include the CLI report scheduler 122 and the report component 124. The scheduling component 120 may optionally include the SRS scheduler 126. In some implementations, the scheduling component 120 may optionally include a capability receiver 1210 for receiving an indication of UE capabilities 1010, 1012. The scheduling component 120 also may include a receiver component 1250 and a transmitter component 1252. The receiver component 1250 may include, for example, a RF receiver for receiving the signals described herein. The transmitter component 1252 may include for example, an RF transmitter for transmitting the signals described herein. In some implementations, the receiver component 1250 and the transmitter component 1252 may be co-located in a transceiver.

The receiver component 1250 may receive uplink signals from multiple UEs 104. For example, the receiver component 1250 may receive a SRS from the aggressor UE 104a and a CLI report from the victim UE 104b. The receiver component 1250 may receive UE capabilities 1010, 1012 from any UE. The receiver component 1250 may provide the CLI report to the report component 124. The receiver component 1250 may provide the UE capabilities to the capability receiver 1210.

The capability receiver 1210 may receive one or more indications of UE capabilities 1010, 1012. The capability receiver 1210 may determine whether a UE is to be a victim UE or an aggressor UE based on the received capabilities. In some implementations, a UE may be capable of being either a victim UE or an aggressor UE. The role of a particular UE may vary based on scheduling within a particular slot. Additionally, for a full-duplex UE, the UE may be considered both an aggressor UE and victim UE when scheduled to transmit and receive in the same slot. The capability receiver 1210 may provide the capabilities of an aggressor UE to the SRS scheduler 126. The capability receiver 1210 may provide the capabilities of a victim UE to the CLI report scheduler 122.

The SRS scheduler 126 may receive UE capabilities of an aggressor UE from the capability receiver 1210. The SRS scheduler 126 may schedule the aggressor UE to transmit one or more SRS transmissions. For example, the SRS scheduler 126 may transmit an SRS configuration as an RRC message via the transmitter component 1252. In some implementations, depending on UE capabilities, the SRS scheduler 126 may transmit a group common DCI 900, where the first part 910 may indicate SRS resources.

The CLI report scheduler 122 may receive UE capabilities for one or more victim UEs from the capability receiver 1210. The CLI report scheduler 122 may receive an indication of SRS scheduling from the SRS scheduler 126. The CLI report scheduler 122 may configure the one or more victim UEs to measure CLI based on a scheduled SRS transmission. The CLI report scheduler 122 may configure the one or more victim UEs to transmit a CLI report 1050 based on the measured CLI. In particular, the report component 124 may transmit a CLI report configuration indicating one or more properties of the CLI report as described herein. The CLI report may be associated with one or more CSI-IM resource sets corresponding to a SRS transmission of an aggressor UE 104a. In some implementations, the CLI report scheduler 122 may transmit the group common DCI 900, or the second part 920 to indicate CSI-IM resources and cyclic shifts to the victim UE.

The report component 124 may receive a CLI report from one or more victim UEs 104. The report component 124 may determine effects of cross-link interference on the victim UEs. In some implementations, the report component 124 may adjust scheduling based on the CLI reports. For example, the report component 124 may provide power control information for PUSCH transmissions that may limit CLI experienced by the victim UEs.

Figure 13:
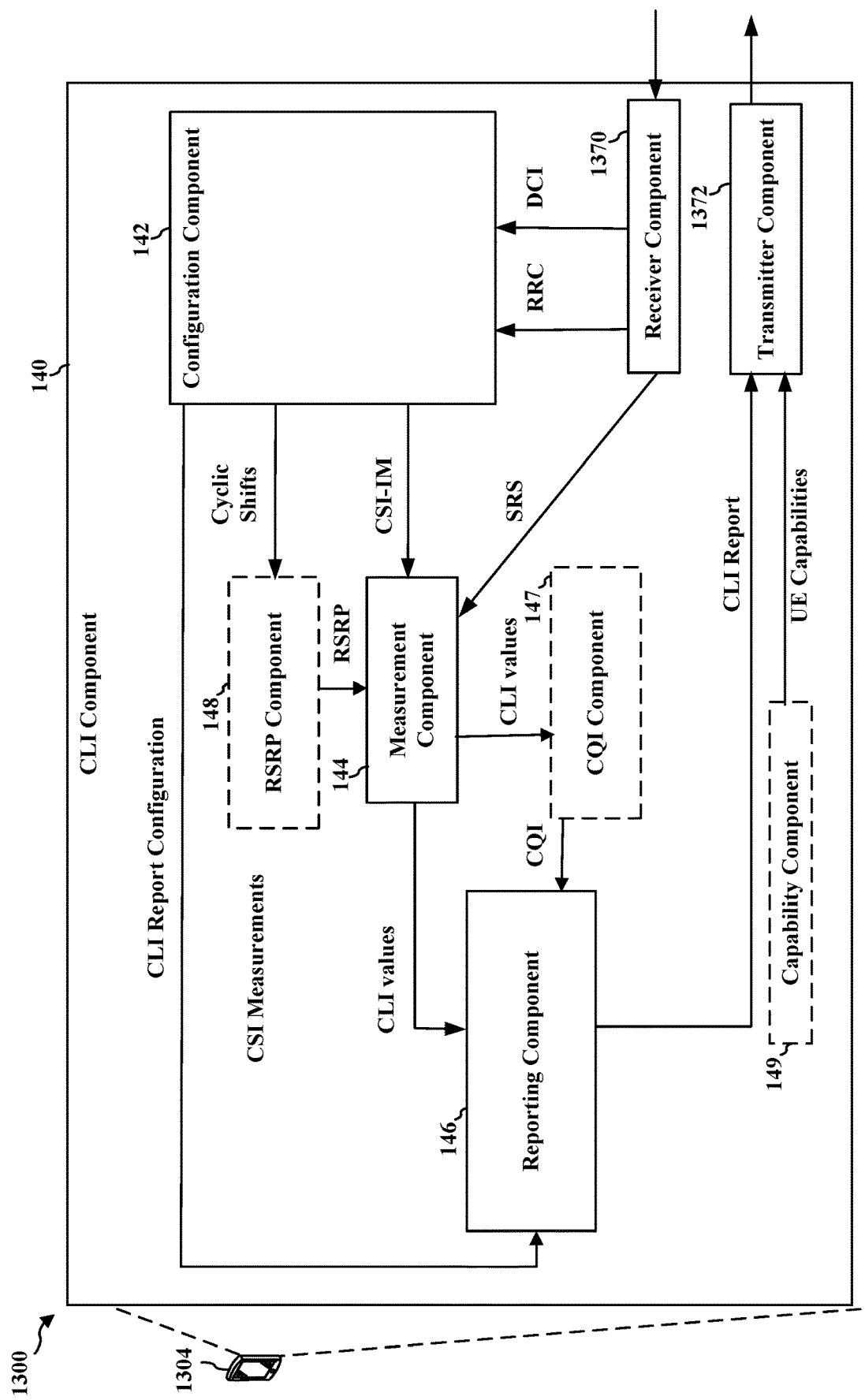
FIG. 13 is a conceptual data flow diagram illustrating the data flow between different means/components in an example UE.

FIG. 13 is a conceptual data flow diagram 1300 illustrating the data flow between different means/components in an example UE 1304, which may be an example of the UE 104 (e.g., victim UE 104b) and include the CLI component 140.

As discussed with respect to FIG. 1, the CLI component 140 may include the configuration component 142, the measurement component 144, and the reporting component 146. In some implementations, the CLI component 140 may include the RSRP component 148. In some implementations, the CLI component 140 may include the capability component 149. In some implementations, the CLI component 140 may include a CQI component 147. The CLI component 140 also may include a receiver component 1370 and a transmitter component 1372. The receiver component 1370 may include, for example, a radio-frequency (RF) receiver for receiving the signals described herein. The transmitter component 1372 may include for example, an RF transmitter for transmitting the signals described herein. In some implementations, the receiver component 1370 and the transmitter component 1372 may be co-located in a transceiver.

The receiver component 1370 may receive downlink signals such as the RRC signaling 1022 or the group common DCI 900. The receiver component 1370 may receive cross-link interference such as interference 1042 from the SRS 1040. The receiver component 1370 may provide the RRC signaling 1022 and the group common DCI 900 to the configuration component 142. The receiver component 1370 may provide the cross link interference to the measurement component 144.

The configuration component 142 may receive the RRC signaling 1020 from the receiver component 1370. The configuration component 142 may extract RRC configured parameters from the RRC signaling 1020, for example, by decoding the RRC signaling. For example, the configuration component 142 may extract parameters of the CLI report configuration such as an indication of CLI values to report, CLI reporting thresholds, a CQI value to report, or QCL spatial relation parameters. The CLI report configuration may include a number and type of CLI value and uplink resources for transmitting the CLI report. The configuration component 142 may provide the CLI report configuration to the reporting component 146. The configuration component 142 may provide the CLI report configuration to the reporting component 146. The configuration component 142 may receive the group common DCI 900 from the receiver component 1370. In some implementations, the configuration component 142 may determine a cyclic shift associated with each aggressor UE based on the group common DCI or RRC signaling. The configuration component 142 may provide the cyclic shifts to the RSRP component 148. The configuration component 142 may determine CSI-RS resources associated with a CLI report configuration based on either dynamic scheduling or SPS scheduling. In either case, the configuration component 142 may determine the CSI-IM resources to measure. The CSI-IM resources may also be based on an SRS hopping pattern. The configuration component 142 may provide the CSI-IM resources to the measurement component 144.

The measurement component 144 may receive the CSI-IM resources from the configuration component 142. The measurement component 144 may perform measurements on the CSI-IM resources. The base station 102 may refrain from transmitting on the CSI-IM resources, so any signal received on the CSI-IM resources may be considered cross-link interference. In an aspect, the measurement component 144 may measure a received signal strength indicator (RSSI) to capture the amount of cross-link interference. The measurement component 144 may provide CLI values to the reporting component 146. The measurement component 144 may optionally provide CLI values to the CQI component 147 based on whether the configuration for CLI reporting indicates inclusion of a CQI value.

The CQI component 147 may receive the CLI values from the measurement component 144. The CQI component 147 may measure other reference signals such as a CSI-RS. The CQI component 147 may determine a CQI value based on the CLI values and the measurements of the CSI-RS. The CQI component 147 may provide the CQI values to the reporting component 146.

The RSRP component 148 may receive the configured cyclic shifts from the configuration component 142. The RSRP component 148 may receive the SRS from the receiver component 1370 or the measurement component 144. The RSRP component 148 may measure an RSRP associated with each cyclic shift of the SRS. The RSRP component 148 may provide the measured RSRPs and associated cyclic shifts to the measurement component 144 or directly to the reporting component 146.

The reporting component 146 may transmit a CLI report based on the CLI report configuration and the measurements. For example, the reporting component 146 may determine a number of CLI values to report. The reporting component 146 may average the measured CLI values if indicated by the report configuration. The reporting component 146 may determine uplink resources for the CLI report based on the CLI report configuration. The reporting component 146 may transmit the CLI report via the transmitter component 1372.

The capability component 149 may transmit an indication of one or more capabilities of the UE 1304 related to CLI reporting as described herein. For example, the capability component 149 may transmit an RRC message indicating whether the UE 1304 is capable of performing any of the actions described herein. Example capabilities that may be reported include support for: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot.

Figure 14:
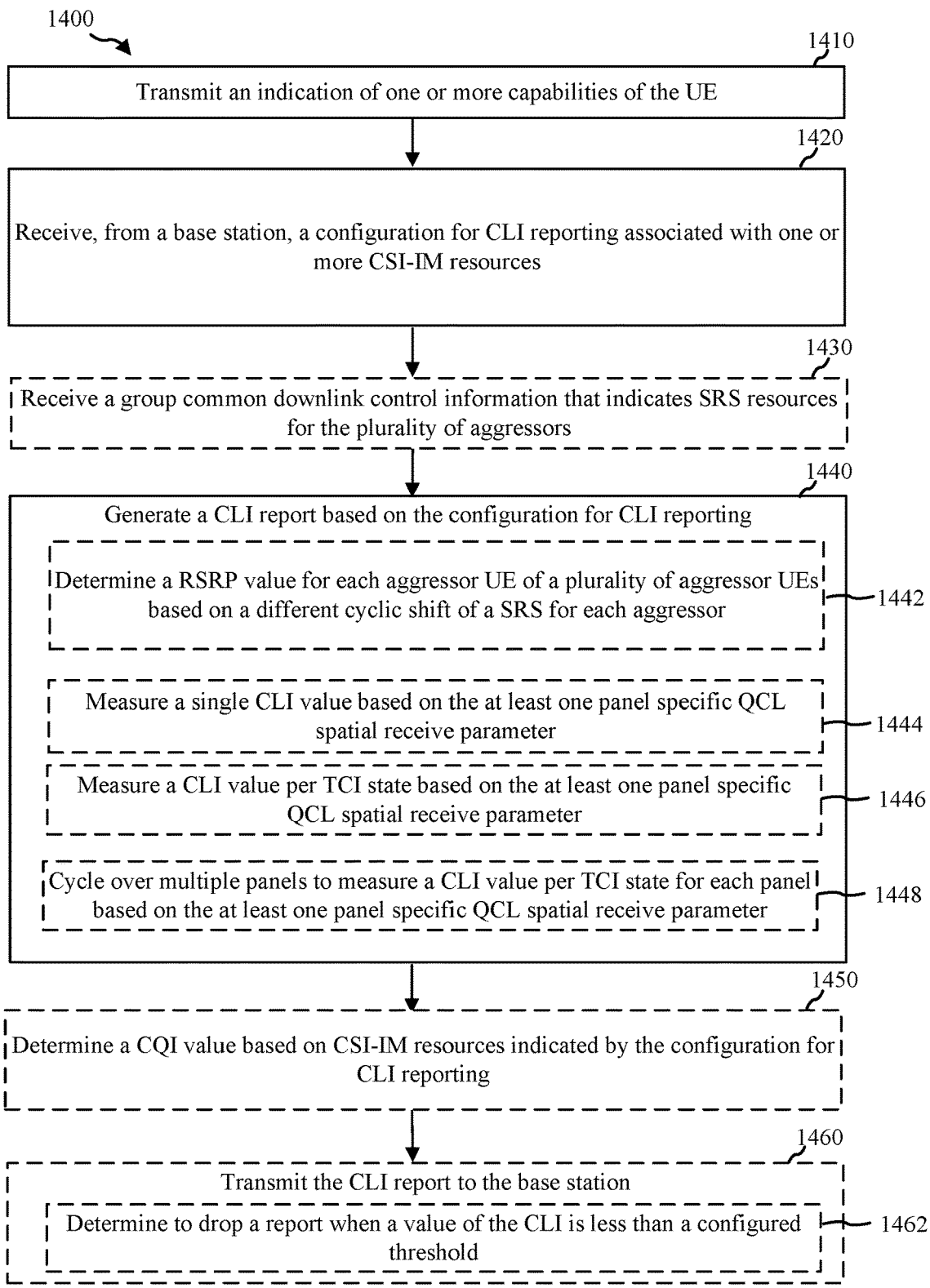
FIG. 14 is a flowchart of an example method of CLI reporting for a UE.

FIG. 14 is a flowchart of an example method 1400 for a victim UE to report CLI. The method 1400 may be performed by a UE (such as the UE 104, which may include the memory 360 and which may be the entire UE 104 or a component of the UE 104 such as the CLI component 140, TX processor 368, the RX processor 356, or the controller/processor 359). The method 1400 may be performed by the CLI component 140 in communication with the scheduling component 120 of the base station 102. Optional blocks are shown with dashed lines.

At block 1410, the method 1400 may optionally include transmitting an indication of one or more capabilities of the UE. In some implementations, for example, the UE 104, the TX processor 368, or the controller/processor 359 may execute the CLI component 140 or the capability component 149 to transmit the indication of one or more capabilities of the UE. Example capabilities may include whether the victim UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot. Accordingly, the UE 104, the TX processor 368, or the controller/processor 359 executing the CLI component 140 or the capability component 149 may provide means for transmitting an indication of one or more capabilities of the UE.

At block 1420, the method 1400 may include receiving, from a base station, a configuration for CLI reporting associated with one or more CSI-IM resources. In some implementations, for example, the UE 104, the RX processor 356, or the controller/processor 359 may execute the CLI component 140 or the configuration component 142 to receive, from the base station 102, the configuration (e.g., RRC signaling 1020) for CLI reporting associated with one or more CSI-IM resources. In some implementations, the CSI-IM resources are defined with respect to a SBFD configuration on which the UE is configured to receive on two downlink sub-bands separated by an uplink sub-band. The configuration for CLI reporting may schedule semi-persistent or periodic CLI reporting according to one of: a wideband CLI report including a single CLI value measured over the two downlink sub-bands or a narrowband CLI report including two CLI values corresponding to the two downlink sub-bands. Alternatively, the configuration for CLI reporting may schedule semi-persistent or periodic CLI reporting that cycles over two CLI values measured over the two downlink sub-bands In some implementations, a CSI-IM configuration associated with CLI reporting configures one or more CSI-IM resources that match a SRS frequency hopping pattern of an aggressor UE. The CSI-IM configuration may indicate a CSI-IM resource set for each slot that matches the SRS frequency hopping pattern of the aggressor UE or a CSI-IM resource pattern that corresponds to the SRS frequency hopping pattern of the aggressor UE. In some implementations, the configuration for CLI reporting indicates a wideband CLI report over a sounding bandwidth or a narrowband CLI report matching a per-hop bandwidth. Accordingly, the UE 104, the RX processor 356, or the controller/processor 359 executing the CLI component 140 or the configuration component 142 may provide means for receiving, from a base station, a configuration for CLI reporting associated with one or more CSI-IM resources.

At block 1430, the method 1400 may optionally include receiving a group common downlink control information that indicates SRS resources for the plurality of aggressor UEs. In some implementations, for example, the UE 104, the RX processor 356, or the controller/processor 359 may execute the CLI component 140 or the receiver component 1370 to receive a group common downlink control information that indicates SRS resources for the plurality of aggressor UEs. Accordingly, the UE 104, the RX processor 356, or the controller/processor 359 executing the CLI component 140 or receiver component 1370 may provide means for receiving a group common downlink control information that indicates SRS resources for the plurality of aggressor UEs.

At block 1440, the method 1400 may include generating a CLI report based on the configuration for CLI reporting. In some implementations, for example, the UE 104, the RX processor 356, or the controller/processor 359 may execute the CLI component 140 or the measurement component 144 to generate a CLI report based on the configuration for CLI reporting. In sub-block 1442, the block 1440 may optionally include determining a RSRP value for each aggressor of a plurality of aggressor UEs based on a different cyclic shift of a SRS for each aggressor. In some implementations, the CLI report may include pairs of a RSRP value and the cyclic shift for each aggressor UE. In some implementations, the CLI report includes only RSRP values above a threshold.

In some implementations, where the configuration for CLI reporting indicates at least one panel specific QCL spatial receive parameter associated with a TCI state for CLI measurement, the block 1440 may be based on the panel specific QCL spatial receive parameter. In sub-block 1444, the block 1440 may include measuring a single CLI value based on the at least one panel specific QCL spatial receive parameter. Alternatively, in sub-block 1446, the block 1440 may include measuring a CLI value per TCI state based on the at least one panel specific QCL spatial receive parameter. As yet another example, in sub-block 1448, the block 1440 may include cycling over multiple panels to measure a CLI value per TCI state for each panel based on the at least one panel specific QCL spatial receive parameter.

In some implementations, the configuration for CLI reporting indicates a CSI-IM resource set including resources on different symbols, wherein the CSI-IM resource set is associated with a list of TCI states, each resource corresponding to one TCI state on the list of TCI states. The block 1440 may optionally include using a QCL spatial receive parameter of a TCI state corresponding to a PDSCH when the PDSCH is rate-matched with one of the CSI-IM resources on the same symbol. The block 1440 may optionally include using a QCL spatial receive parameter of the TCI state that corresponds to the CSI-IM resource when a PDSCH is received on a different symbol than the CSI-IM resource. The PDSCH may be separated from the CSI-IM resource by one or more guard symbols.

In view of the foregoing, the UE 104, the RX processor 356, or the controller/processor 359 executing the CLI component 140 or measurement component 144 may provide means for generating a CLI report based on the configuration for CLI reporting.

At block 1450, the method 1400 may optionally include determining a CQI value based on CSI-IM resources indicated by the configuration for CLI reporting. In some implementations, for example, the UE 104, the TX processor 368, or the controller/processor 359 may execute the CLI component 140 or the CQI component 147 to determine the CQI value based on CSI-IM resources indicated by the configuration for CLI reporting. The configuration for CLI reporting may indicate whether to include the CQI value in the CLI report. For example, the configuration for CLI reporting may that the CLI report is to include the CQI value and at least one CLI value. Additionally the configuration for CLI reporting may associate the CLI report with a CSI-RS corresponding to the CQI value. Accordingly, the UE 104, the TX processor 368, or the controller/processor 359 executing the CLI component 140 or the CQI component 147 may provide means for determining a CQI value based on CSI-IM resources indicated by the configuration for CLI reporting.

At block 1460, the method 1400 may include transmitting the CLI report to the base station. In some implementations, for example, the UE 104, the TX processor 368, or the controller/processor 359 may execute the CLI component 140 or the reporting component 146 to transmit the CLI report to the base station. In some implementations, at sub-block 1462, the block 1460 may include determining to drop a report when a value of the CLI is less than a configured threshold. For example, the reporting component 146 may determine whether to transmit the CLI report based on an individual CLI threshold for each aggressor. As another example, the reporting component 146 may determine whether to transmit the CLI report based on whether an accumulated CLI for the multiple aggressor UEs exceeds an aggregate CLI threshold. As yet another example, the reporting component 146 may determine whether to include an individual CLI value for an individual CSI-IM resource in the CLI report based on whether the individual CLI value exceeds a corresponding per-resource CLI threshold for an individual aggressor. Accordingly, the UE 104, the TX processor 368, or the controller/processor 359 executing the CLI component 140 or the reporting component 146 may provide means for transmitting the CLI report to the base station.

Figure 15:
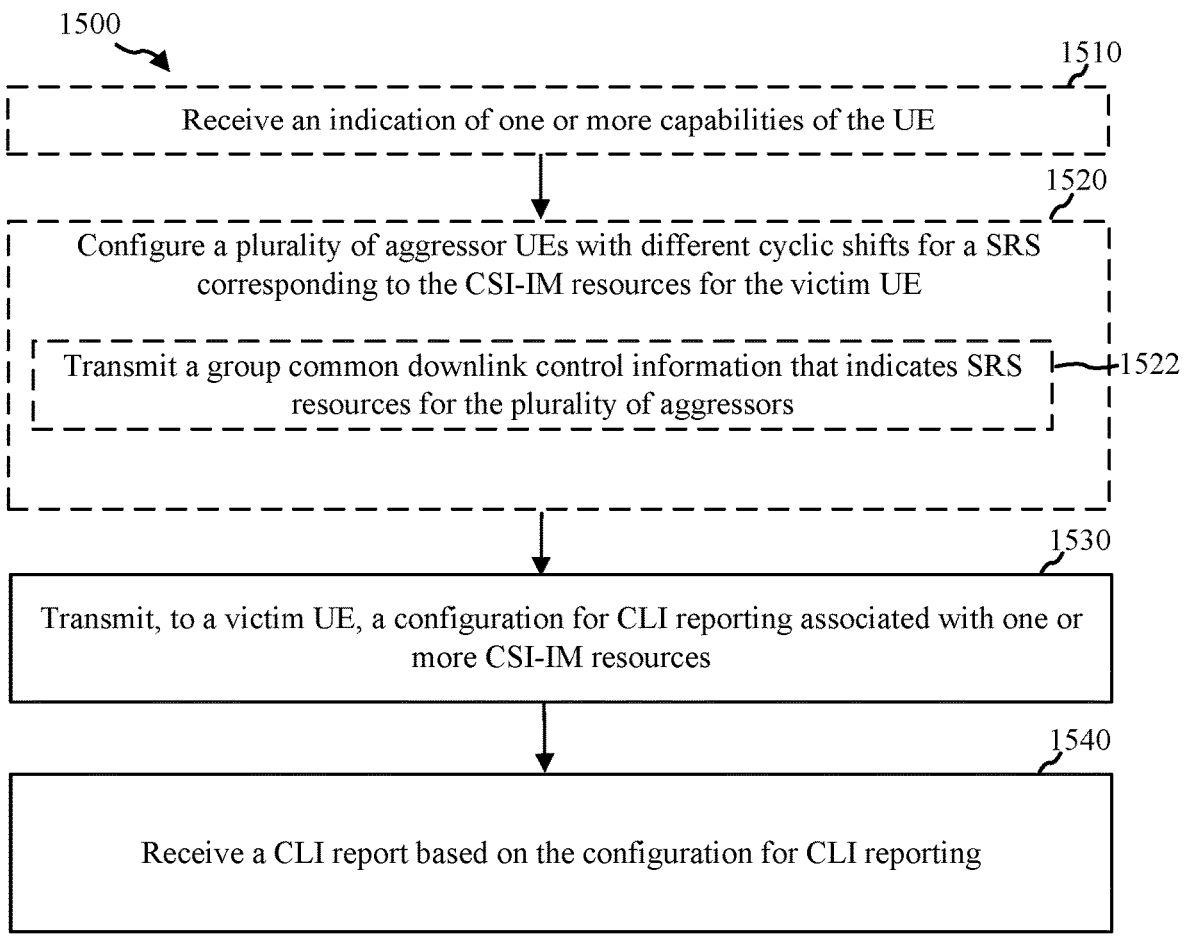
FIG. 15 is a flowchart of an example method of configuring a victim UE for CLI reporting based on a transmission of an aggressor UE.

FIG. 15 a flowchart of an example method 1500 for a base station to configure a victim UE for CLI reporting. The method 1500 may be performed by a base station (such as the base station 102, which may include the memory 376 and which may be the entire base station 102 or a component of the base station 102 such as the scheduling component 120, TX processor 316, the RX processor 370, or the controller/processor 375). The method 1500 may be performed by the scheduling component 120 in communication with the CLI component 140 of the victim UE 104b and the SRS component 198 of the aggressor UE 104a.

At block 1510, the method 1500 may optionally include receiving an indication of one or more capabilities of a UE. In some implementations, for example, the base station 102, RX processor 370, or the controller/processor 375 may execute the scheduling component 120 or the capability receiver 1210 to receive an indication of one or more capabilities of the UE. The UE may be the aggressor UE 104a, the victim UE 104b, or both. Accordingly, the base station 102, RX processor 370, or the controller/processor 375 executing the scheduling component 120 or the capability receiver 1210 may provide means for receiving an indication of one or more capabilities of the UE.

At block 1520, the method 1500 may include configuring a plurality aggressor UEs with different cyclic shifts for a SRS corresponding to the CSI-IM resources for the victim UE. In some implementations, for example, the base station 102, TX processor 316, or the controller/processor 375 may execute the scheduling component 120 or the SRS scheduler 126 to configure a plurality aggressor UEs with different cyclic shifts for the SRS 1040 corresponding to the CSI-IM resources for the victim UE 104b. For example, at sub-block 1522, the block 1520 may include transmitting a group common downlink control information (e.g., group common DCI 900) that indicates SRS resources for the plurality of aggressor UEs. Accordingly, the base station 102, TX processor 316, or the controller/processor 375 executing the scheduling component 120 or the SRS scheduler 126 may provide means for configuring a plurality of aggressor UEs with different cyclic shifts for a SRS corresponding to the CSI-IM resources for the victim UE.

At block 1530, the method 1500 may include transmitting, to a victim UE, a configuration for CLI reporting associated with one or more CSI-IM resources. In some implementations, for example, the base station 102, TX processor 316, or the controller/processor 375 may execute the scheduling component 120 or the CLI report scheduler 122 to transmit, to a victim UE 104b, a configuration for CLI reporting associated with one or more CSI-IM resources. Accordingly, the base station 102, TX processor 316, or the controller/processor 375 executing the scheduling component 120 or the CLI report scheduler 122 may provide means for transmitting, to a victim UE, a configuration for CLI reporting associated with one or more CSI-IM resources.

At block 1540, the method 1500 may include receiving a CLI report based on the configuration for CLI reporting. In some implementations, for example, the base station 102, RX processor 370, or the controller/processor 375 may execute the scheduling component 120 or the report component 124 to receive a CLI report based on the configuration for CLI reporting. Accordingly, the base station 102, RX processor 370, or the controller/processor 375 executing the scheduling component 120 or the report component 124 may provide means for receiving a CLI report based on the configuration for CLI reporting.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
receiving, from a base station, a configuration for cross-link interference (CLI) reporting associated with one or more channel state information interference measurement (CSI-IM) resources, wherein a CSI-IM configuration associated with the CLI reporting configures one or more CSI-IM resources that match a sounding reference signal (SRS) frequency hopping pattern of an aggressor UE;
generating a CLI report based on the configuration for CLI reporting; and
transmitting the CLI report to the base station.

2. The method of claim 1, wherein the CSI-IM resources are defined with respect to a sub-band full-duplex (SBFD) configuration on which the UE is configured to receive on two downlink sub-bands separated by an uplink sub-band.

3. The method of claim 2, wherein the configuration for CLI reporting schedules an aperiodic CLI report and indicates at least one of: a wideband CLI report including a single CLI value measured over the two downlink sub-bands or a narrowband CLI report including two CLI values corresponding to the two downlink sub-bands.

4. The method of claim 2, wherein the configuration for CLI reporting schedules semi-persistent or periodic CLI reporting according to one of: a wideband CLI report including a single CLI value measured over the two downlink sub-bands or a narrowband CLI report including two CLI values corresponding to the two downlink sub-bands.

5. The method of claim 2, wherein the configuration for CLI reporting schedules semi-persistent or periodic CLI reporting that cycles over two CLI values measured over the two downlink sub-bands.

6. The method of claim 1, wherein the CLI report includes an average CLI measurement over the one or more CSI-IM resources.

7. The method of claim 1, wherein the CSI-IM configuration indicates a CSI-IM resource set for each slot that matches the SRS frequency hopping pattern of the aggressor UE or a CSI-IM resource pattern that corresponds to the SRS frequency hopping pattern of the aggressor UE.

8. The method of claim 1, wherein the configuration for CLI reporting indicates a wideband CLI report over a sounding bandwidth.

9. The method of claim 1, wherein the configuration for CLI reporting indicates a narrowband CLI report matching a per-hop bandwidth.

10. The method of claim 1, wherein the configuration for CLI reporting is associated with multiple CSI-IM resources corresponding to multiple aggressor UEs.

11. The method of claim 10, wherein transmitting the CLI report to the base station comprises determining whether to transmit the CLI report based on an individual CLI threshold for each aggressor.

12. The method of claim 10, wherein transmitting the CLI report to the base station comprises determining whether to transmit the CLI report based on whether an accumulated CLI for the multiple aggressor UEs exceeds an aggregate CLI threshold.

13. The method of claim 1, further comprising determining a channel quality indicator (CQI) value based on CSI-IM resources indicated by the configuration for CLI reporting.

14. The method of claim 13, wherein the configuration for CLI reporting indicates whether to include the CQI value in the CLI report.

15. The method of claim 1, wherein generating a CLI report based on the configuration for CLI reporting comprises determining a reference signal received power (RSRP) value for each aggressor of a plurality of aggressor UEs based on a different cyclic shift of a sounding reference signal (SRS) for each aggressor.

16. The method of claim 15, wherein the CLI report includes pairs of the RSRP value and the cyclic shift for each aggressor.

17. The method of claim 1, wherein the configuration for CLI reporting indicates at least one panel specific quasi-colocation (QCL) spatial receive parameter associated with a transmission configuration indicator (TCI) state for CLI measurement.

18. The method of claim 17, wherein generating the CLI report based on the configuration for CLI reporting comprises one or more of: measuring a single CLI value based on the at least one panel specific QCL spatial receive parameter; measuring a CLI value per TCI state based on the at least one panel specific QCL spatial receive parameter; or cycling over multiple panels to measure a CLI value per TCI state for each panel based on the at least one panel specific QCL spatial receive parameter.

19. The method of claim 1, wherein the configuration for CLI reporting indicates a CSI-IM resource set including resources on different symbols, wherein the CSI-IM resource set is associated with a list of TCI states, each resource corresponding to one TCI state on the list of TCI states.

20. The method of claim 19, wherein generating the CLI report based on the configuration for CLI reporting comprises using a QCL spatial receive parameter of a TCI state corresponding to a physical downlink shared channel (PDSCH) when the PDSCH is rate-matched with one of the CSI-IM resources on the same symbol.

21. The method of claim 19, wherein generating the CLI report based on the configuration for CLI reporting comprises using a QCL spatial receive parameter of the TCI state that corresponds to the CSI-IM resource when a PDSCH is received on a different symbol than the CSI-IM resource.

22. The method of claim 1, further comprising transmitting an indication of whether the UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot.

23. A method of wireless communication for a base station, comprising:
    transmitting, to a victim user equipment (UE), a configuration for cross-link interference (CLI) reporting associated with one or more channel state information interference measurement (CSI-IM) resources, wherein the configuration associated with CLI reporting configures one or more CSI-IM resources that match a sounding reference signal (SRS) frequency hopping pattern of an aggressor UE; and
    receiving a CLI report based on the configuration for CLI reporting.

24. The method of claim 23, wherein the CSI-IM resources are defined with respect to a sub-band full-duplex (SBFD) configuration on which the UE is configured to receive on two downlink sub-bands separated by an uplink sub-band.

25. The method of claim 23, wherein the configuration for CLI reporting is associated with multiple CSI-IM resources corresponding to multiple aggressor UEs.

26. The method of claim 23, wherein the configuration for CLI reporting indicates whether to include in the CLI report a channel quality indicator (CQI) value based on the CSI-IM resources associated with the configuration for CLI reporting.

27. The method of claim 23, further comprising configuring a plurality of aggressor UEs with different cyclic shifts for a sounding reference signal (SRS) corresponding to the CSI-IM resources for the victim UE.

28. The method of claim 23, wherein the configuration for CLI reporting indicates at least one panel specific quasi-colocation (QCL) spatial receive parameter associated with a transmission configuration indicator (TCI) state for CLI measurement.

29. The method of claim 23, wherein the configuration for CLI reporting indicates a CSI-IM resource set including resources on different symbols, wherein the CSI-IM resource set is associated with a list of TCI states, each resource corresponding to one TCI state on the list of TCI states.

30. The method of claim 23, further comprising receiving an indication of whether the UE supports one or more of: CLI measurement using CSI-IM resources; sub-band CLI reporting; sub-band cycling for semi-persistent sub-band CLI reporting; CSI-IM resource configuration with frequency hopping to match SRS patterns; per resource CLI thresholds; aggregate CLI thresholds; joint CQI and CLI reporting; CLI RSRP reporting for SRS with different cyclic shifts; per TCI state CLI reporting for multiple panels; using different QCL spatial receive parameters for CSI-IM and PDSCH in a same slot; using different QCL spatial receive parameters for CSI-IM and PDSCH on adjacent symbols; or a number of guard symbols between CSI-IM and PDSCH with different QCL spatial receive parameters in a same slot.

31. An apparatus for wireless communication at a user equipment (UE), comprising:
    a memory storing computer-executable instructions; and
    at least one processor communicatively coupled with the memory and configured to execute the instructions to:
        receive, from a base station, a configuration for cross-link interference (CLI) reporting associated with one or more channel state information interference measurement (CSI-IM) resources, wherein a resource measurement configuration associated with CLI reporting configures one or more CSI-IM resources that match a sounding reference signal (SRS) frequency hopping pattern of an aggressor UE;
        generate a CLI report based on the configuration for CLI reporting; and
        transmit the CLI report to the base station.

32. An apparatus of a base station for wireless communication, comprising:
    a memory storing computer-executable instructions; and
    at least one processor communicatively coupled with the memory and configured to execute the instructions to:
        transmit, for a victim user equipment (UE), a configuration for cross-link interference (CLI) reporting associated with one or more channel state information interference measurement (CSI-IM) resources, wherein the configuration associated with CLI reporting configures one or more CSI-IM resources that match a sounding reference signal (SRS) frequency hopping pattern of an aggressor UE; and
        receive a CLI report based on the configuration for CLI reporting.

33. An apparatus for wireless communication at a user equipment (UE), comprising:
    means for receiving, from a base station, a configuration for cross-link interference (CLI) reporting associated with one or more channel state information interference measurement (CSI-IM) resources, wherein a resource measurement configuration associated with CLI reporting configures one or more measurement resources that match a sounding reference signal (SRS) frequency hopping pattern of an aggressor UE;
    means for generating a CLI report based on the configuration for CLI reporting; and
    means for transmitting the CLI report to the base station.

34. The apparatus of claim 31, wherein the CLI report includes an average CLI measurement over the one or more CSI-IM resources.

35. The apparatus of claim 32, wherein the CLI report includes an average CLI measurement over the one or more CSI-IM resources.

* * * * *